United States Patent
Yamamoto et al.

(10) Patent No.: US 9,054,880 B2
(45) Date of Patent: Jun. 9, 2015

(54) INFORMATION PROCESSING DEVICE, CONTROLLER, KEY ISSUING AUTHORITY, METHOD FOR JUDGING REVOCATION LIST VALIDITY, AND KEY ISSUING METHOD

(75) Inventors: Masaya Yamamoto, Osaka (JP);
Takahiro Yamaguchi, Osaka (JP)

(73) Assignee: PANASONIC CORPORATION, Osaka (JP)

(*) Notice: Subject to any disclaimer, the term of this patent is extended or adjusted under 35 U.S.C. 154(b) by 38 days.

(21) Appl. No.: 13/188,810

(22) Filed: Jul. 22, 2011

(65) Prior Publication Data

US 2012/0023329 A1  Jan. 26, 2012

Related U.S. Application Data

(60) Provisional application No. 61/367,063, filed on Jul. 23, 2010.

(51) Int. Cl.
*H04L 9/12* (2006.01)
*H04L 9/32* (2006.01)
(Continued)

(52) U.S. Cl.
CPC ............ *H04L 9/3268* (2013.01); *H04L 9/0891* (2013.01); *G06F 21/57* (2013.01); *H04L 9/3297* (2013.01); *H04L 9/0844* (2013.01); *H04L 9/3252* (2013.01); *H04L 9/3273* (2013.01); *H04L 2209/60* (2013.01)

(58) Field of Classification Search
CPC ................ H04L 9/0844; H04L 9/0891; H04L 9/3247–9/3257; H04L 9/3263–9/3268; H04L 9/3273; H04L 9/3294–9/3297; H04L 2209/60–2209/608; G06F 21/57–21/577; G06F 21/62–21/645
See application file for complete search history.

(56) References Cited

U.S. PATENT DOCUMENTS

| | | | |
|---|---|---|---|
| 2002/0184259 A1 | 12/2002 | Akishita et al. | |
| 2005/0076208 A1* | 4/2005 | Hori et al. | ...... 713/165 |
| 2006/0168357 A1* | 7/2006 | Nakano et al. | ...... 710/5 |

(Continued)

FOREIGN PATENT DOCUMENTS

| | | |
|---|---|---|
| CN | 101488352 A | 7/2009 |
| JP | 2002-135243 | 5/2002 |

(Continued)

OTHER PUBLICATIONS

Chinese Office Action and Search Report issued Dec. 9, 2014 in Chinese Application No. 201180003943.4 (with partial English translation).

*Primary Examiner* — Linglan Edwards
*Assistant Examiner* — Kevin Bechtel
(74) *Attorney, Agent, or Firm* — Wenderoth, Lind & Ponack, L.L.P.

(57) ABSTRACT

A memory card includes a storage unit storing key information and version information in association with the key information, the key information and the version information being issued by a key issuing authority and the version information indicating a version of the latest revocation list that has been issued when the key information is generated. A revocation list receiving unit receives a revocation list having a version; and a version verification unit compares the version of the revocation list received by the revocation list receiving unit and the version information. When the version of the revocation list is older than version information, processing by a revocation list writing unit is prohibited.

11 Claims, 15 Drawing Sheets

(51) Int. Cl.
*H04L 9/08* (2006.01)
*G06F 21/57* (2013.01)

(56) References Cited

U.S. PATENT DOCUMENTS

| | | |
|---|---|---|
| 2007/0174919 A1* | 7/2007 | Raines et al. .................. 726/27 |
| 2007/0209077 A1 | 9/2007 | Kitani |
| 2007/0263869 A1* | 11/2007 | Oh et al. ....................... 380/255 |
| 2009/0183262 A1 | 7/2009 | Ueda et al. |
| 2009/0208003 A1 | 8/2009 | Matsukawa et al. |
| 2013/0132718 A1* | 5/2013 | Agrawal ........................ 713/158 |

FOREIGN PATENT DOCUMENTS

| | | |
|---|---|---|
| JP | 2005-352522 | 12/2005 |
| JP | 2005-352523 | 12/2005 |
| JP | 2007-25913 | 2/2007 |
| JP | 2009-194757 | 8/2009 |

* cited by examiner

INFORMATION PROCESSING DEVICE, CONTROLLER, KEY ISSUING AUTHORITY, METHOD FOR JUDGING REVOCATION LIST VALIDITY, AND KEY ISSUING METHOD

This application claims benefit to the provisional U.S. Application 61/367,063, filed on Jul. 23, 2010.

BACKGROUND OF INVENTION

1. Technical Field

The present invention relates to information processing devices that use a revocation list.

2. Background Art

In a system in which a host (playback device) plays back a content stored on a memory card, the memory card and the host perform encrypted communication. In recent years, a method called Public Key Infrastructure (PKI) has been under study for use in encrypted communication between the memory card and the host.

In a PKI, both the memory card and the host have a private key and a public key certificate. The public key certificate includes a certificate ID and a public key and it is associated with the digital signature of a legitimate key authority.

The memory card and the host perform mutual authentication and share a session key using a method such as the Diffie-Hellman method for exchanging keys, which is based on the complexity of prime factorization, or the Elliptic Curve Diffie-Hellman (EC-DH) method for exchanging keys, which is based on the discrete logarithm problem on elliptic curves. The memory card and the host perform encrypted communication using a shared session key.

Private keys, which need to be kept confidential, may be leaked for reasons such as negligence by manufacturers or leakage of information by malicious attackers. In the PKI, a revocation list is used to stop encrypted communications in such cases.

The revocation list is a list of certificate IDs for devices whose private key has been leaked. By using the revocation list, encrypted communication can be stopped when it is determined that the certificate ID of the other party to communication is included in the revocation list.

CITATION LIST

Patent Literature

[Patent Literature 1] Japanese Patent Application Publication No. 2005-352522

SUMMARY OF INVENTION

When a device whose private key has been leaked is newly added to the revocation list, the version of the revocation list is updated. However, the card manufacturer is entrusted to perform processing for storage of the revocation list on the memory card.

It can be imagined that the card manufacturer might accidently store an old version of the revocation list on the memory card, or in order to whet consumer appetite, may store an older version of the revocation list on purpose.

If an old version of the revocation list is stored on the memory card, the probability of a malicious device being able to use the content increases, and it is not possible to stop such improper access.

The present invention has been conceived in light of the above problems, and it is an object thereof to provide an information processing device, a controller, a key issuing authority, a method for judging revocation list validity, and a key issuing method that prevent a card manufacturer from storing an older version of a revocation list on a memory card.

In order to achieve the above objective, the present invention is an information processing device for performing authentication and key exchange using key information, the information processing device comprising: a storage unit storing the key information and a latest version in association with the key information, the key information and the latest version being issued by a key issuing authority, and the latest version indicating a version of a latest revocation list that has been issued when the key information is generated; a revocation list receiving unit operable to receive a revocation list having a version; a comparison unit operable to compare the version of the revocation list received by the revocation list receiving unit and the latest version; and a control unit operable to prevent predetermined processing when the version of the revocation list is older than the latest version.

With the above structure, the information processing device prevents processing using an old version of the revocation list.

Even if a manufacturer writes an old version of the revocation list on the information processing device, the control unit of the information processing device prohibits predetermined processing. Accordingly, an information processing device that does not operate normally is manufactured. Therefore, with the above structure, it is expected that manufacturers will write a new revocation list on the information processing device in order to prevent manufacture of an information processing device that does not operate normally.

BRIEF DESCRIPTION OF DRAWINGS

FIG. 7 is a block diagram showing the structure of a memory card 30a.

FIG. 15 is a block diagram showing the structure of a memory card 40a.

DETAILED DESCRIPTION OF INVENTION

Embodiments of the present invention are described below with reference to the drawings.

1. Embodiment 1

Figure 1:
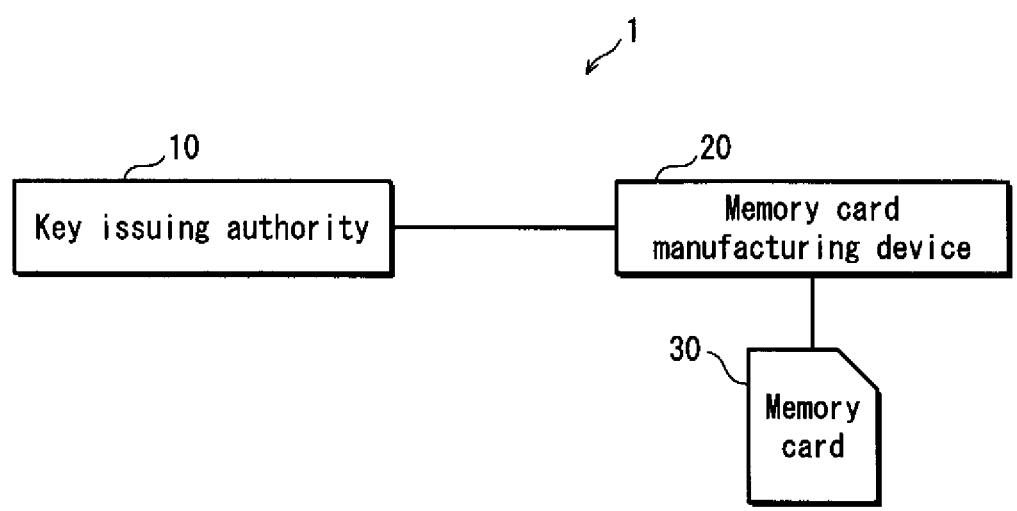
FIG. 1 shows the structure of a memory card manufacturing system 1.

The following describes a memory card manufacturing system 1 according to Embodiment 1 of the present invention.
<Structure>
The memory card manufacturing system 1 is a system for manufacturing a memory card composed of a controller and a flash memory. As shown in FIG. 1, the memory card manufacturing system 1 is composed of a key issuing authority 10, a memory card manufacturing device 20, and as an information processing device according to the present invention, a memory card 30.

The key issuing authority 10 is a device that generates, manages, and distributes key information and a revocation list to be embedded in the memory card.

The memory card manufacturing device 20 is a device of a memory card manufacturer. The memory card manufacturer is a company that assembles and ships the memory card 30. The memory card manufacturer purchases controllers from a controller manufacturer and flash memories from a flash memory manufacturer and then assembles each memory card 30. The memory card manufacturer uses the memory card manufacturing device 20 to transmit the key information and the revocation list acquired from the key issuing authority 10 to the controller of each assembled memory card 30.

(1) Key Issuing Authority 10

Figure 2:
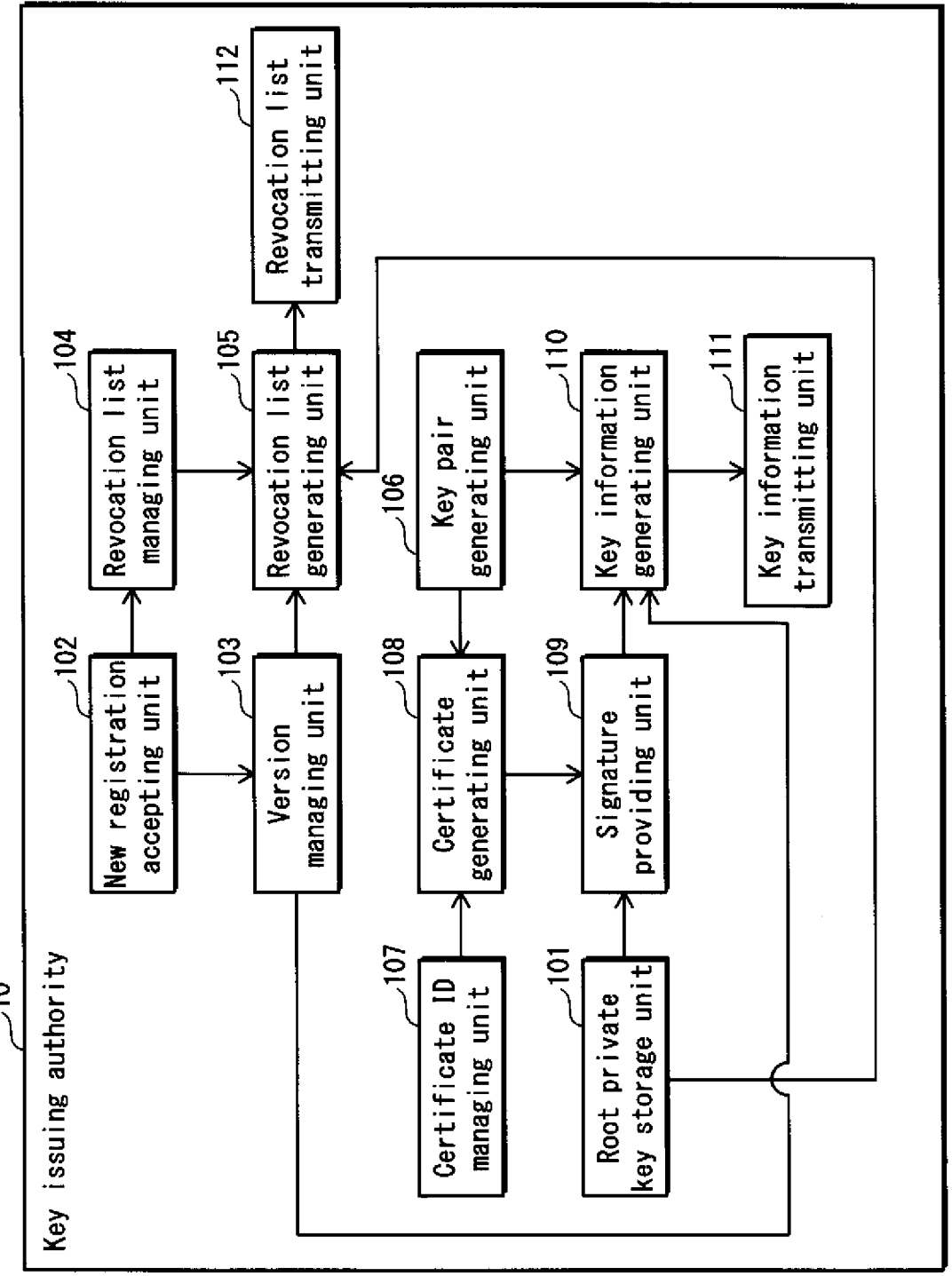
FIG. 2 is a block diagram showing the structure of a key issuing authority 10.

As shown in FIG. 2, the key issuing authority 10 includes a root private key storage unit 101, a new registration accepting unit 102, a version managing unit 103, a revocation list managing unit 104, a revocation list generating unit 105, a key pair generating unit 106, a certificate ID managing unit 107, a certificate generating unit 108, a signature providing unit 109, a key information generating unit 110, a key information transmitting unit 111, and a revocation list transmitting unit 112.

The key issuing authority 10 is specifically a computer system provided with hardware such as a processor, a hard disk, read-only memory (ROM), random access memory (RAM), and the like. Computer programs are stored on the ROM, and the key issuing authority 10 achieves its functions by the processor using the RAM to execute the computer programs.

The root private key storage unit 101 stores a root private key that serves as the source of security in the system. Since leakage of the root private key compromises the entire system, the root private key must be maintained under the utmost security. The root private key forms a key pair with a root public key, described below.

The new registration accepting unit 102 accepts the input of a certificate ID of a public key certificate that is to be newly added to the revocation list (hereinafter, "revoked certificate ID") due to leakage of a private key. Specifically, the new registration accepting unit 102 is composed of an application program and of an input device such as a mouse, keyboard, and the like. An operator inputs the revoked certificate ID by operating the keyboard or the like.

The version managing unit 103 manages the version number of the latest revocation list that has already been issued. Specifically, the version managing unit 103 stores therein "minimum version", which is a version number of the latest revocation list that has been issued. Each time the revocation list generating unit 105 generates a new revocation list, the version managing unit 103 increments the "minimum version" stored therein by one.

The revocation list managing unit 104 accumulates the revoked certificate IDs received by the new registration accepting unit 102.

The revocation list generating unit 105 generates a revocation list from the revoked certificate IDs accumulated in the revocation list managing unit 104.

Figure 3:
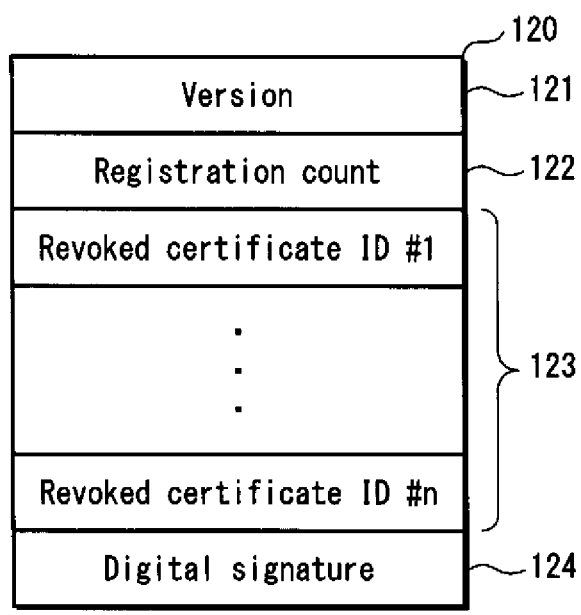
FIG. 3 shows the data structure of a revocation list 120.

The data structure of the revocation list generated by the revocation list generating unit 105 is shown in FIG. 3. As shown in FIG. 3, the revocation list 120 is composed of a version 121, a registration count 122, a list 123, and a digital signature 124.

The version 121 is the version of the revocation list 120. The revocation list generating unit 105 adds "1" to the "minimum version" managed by the version managing unit 103 and sets the result as the version 121.

The registration count 122 is the count of revoked certificate IDs in the list 123. The revocation list generating unit 105 sets the count of the revoked certificate IDs accumulated in the revocation list managing unit 104 as the registration count 122.

The list 123 includes n revoked certificate IDs. The revocation list generating unit 105 generates the list 123 to include all of the revoked certificate IDs accumulated in the revocation list managing unit 104.

The digital signature 124 is a digital signature generated for the version 121, the registration count 122, and the list 123. The revocation list generating unit 105 generates the digital signature 124 by applying a predetermined signature generation algorithm to a data combination composed of the version 121, the registration count 122, and the list 123, using the root private key stored in the root private key storage unit 101 as a signature generation key.

The revocation list generating unit 105 generates the revocation list 120 from the version 121, the registration count 122, the list 123, and the digital signature 124, outputting the generated revocation list 120 to the revocation list transmitting unit 112. Upon generating the revocation list 120, the revocation list generating unit 105 notifies the version managing unit 103 accordingly.

The key pair generating unit 106 generates a key pair of a public key and a private key to provide to the memory card 30. The key pair generating unit 106 outputs the generated public key to the certificate generating unit 108 and outputs the generated private key to the key information generating unit 110.

The certificate ID managing unit 107 manages the public key certificates issued by the key issuing authority 10. It is necessary to be careful not to mistakenly reuse a certificate ID that has already been used. For example, the certificate ID managing unit 107 may increment a counter by one each time the key issuing authority 10 issues a public key certificate and always generate a certificate ID for a new number.

The certificate generating unit 108 generates certificate data that is part of the public key certificate. The certificate generating unit 108 generates certificate data composed of the certificate ID indicated by the certificate ID managing unit 107 and the public key generated by the key pair generating unit 106. The certificate generating unit 108 outputs the generated certificate data to the signature providing unit 109.

The signature providing unit 109 generates a digital signature by applying a predetermined signature generation algorithm to the certificate data received from the certificate generating unit 108, using the root private key stored in the root private key storage unit 101 as a signature generation key. The signature providing unit 109 generates a public key certificate by providing the certificate data with the digital signature and outputs the generated public key certificate to the key information generating unit 110.

The key information generating unit 110 generates key information to transmit to the memory card manufacturing device 20.

Figure 4:
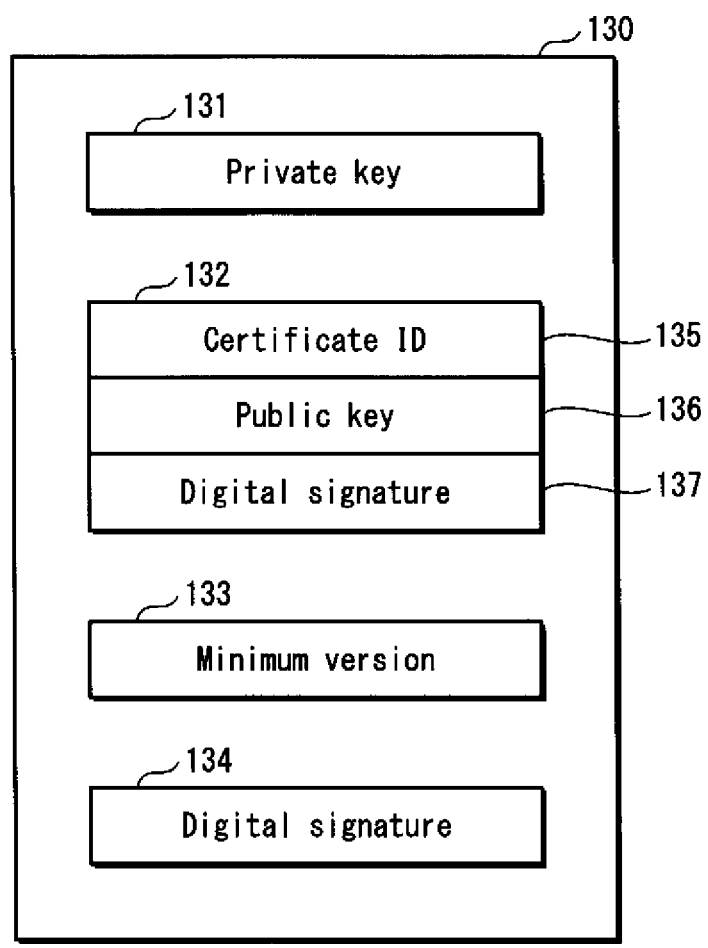
FIG. 4 shows the data structure of key information 130.

FIG. 4 shows the data structure of the key information generated by the key information generating unit 110. As shown in FIG. 4, the key information 130 is composed of a private key 131, a public key certificate 132, a minimum version 133, and a digital signature 134. The public key certificate 132 is composed of a certificate ID 135, a public key 136, and a digital signature 137.

The key information 131 is the private key that the key information generating unit 110 receives from the key pair generating unit 106. The public key certificate 132 is the public key certificate that the key information generating unit 110 receives from the signature providing unit 109. The key information generating unit 110 reads the "minimum version" managed by the version managing unit 103 and sets the read minimum version as the minimum version 133. Furthermore, the key information generating unit 110 generates the digital signature 134 by applying a predetermined signature generation algorithm to a data combination composed of the private key 131, the public key certificate 132, and the minimum version 133, using the root private key stored in the root private key storage unit 101 as a signature generation key.

The key information generating unit 110 generates the key information 130 from the private key 131, the public key certificate 132, the minimum version 133, and the digital signature 134, outputting the generated key information 130 to the key information transmitting unit 111.

Upon receiving a request from the memory card manufacturing device 20, the key information transmitting unit 111 transmits the key information 130 to the memory card manufacturing device 20.

Upon receiving a request from the memory card manufacturing device 20, the revocation list transmitting unit 112 transmits the revocation list 120 to the memory card manufacturing device 20.

(2) Memory Card Manufacturing Device 20

Figure 5:
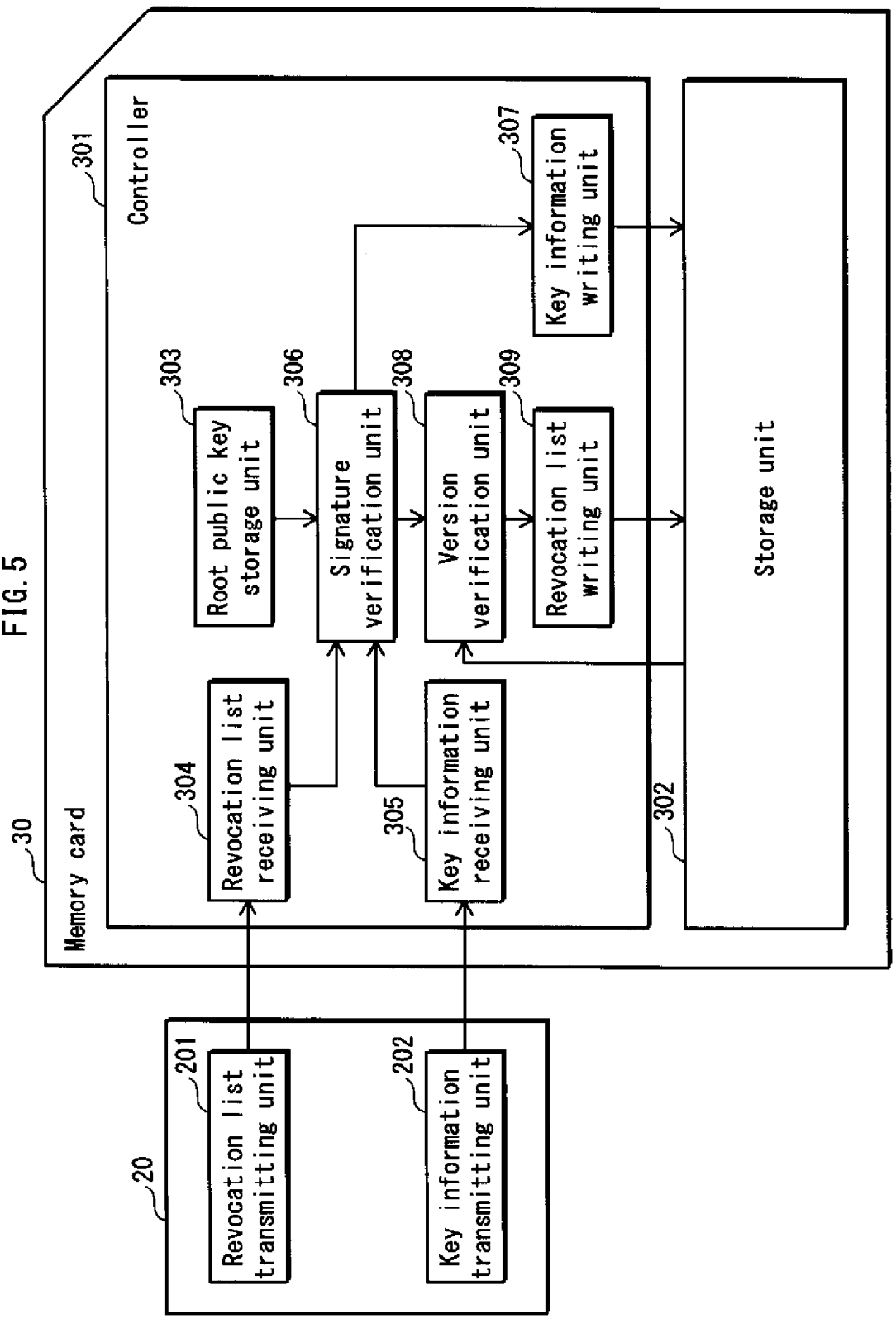
FIG. 5 is a block diagram showing the structure of a memory card manufacturing device 20 and a memory card 30.

As shown in FIG. 5, the memory card manufacturing device 20 includes the revocation list transmitting unit 201 and the key information transmitting unit 202.

The revocation list transmitting unit 201 acquires the revocation list 120 from the key issuing authority 10 and transmits the acquired revocation list 120 to a controller 301 of the memory card 30.

The key information transmitting unit 202 acquires the key information 130 from the key issuing authority 10 and transmits the acquired key information 130 to the controller 301 of the memory card 30.

(3) Memory Card 30

As shown in FIG. 5, the memory card 30 includes the controller 301 and a storage unit 302.

The controller 301 is an large scale integrated (LSI device that the memory card manufacturer acquires from the controller manufacturer. Processing internal to the controller 301 is kept secure, so that information cannot be read by an external device.

The storage unit 302 is a flash memory that the memory card manufacturer acquires from a flash manufacturer. Writing of data to the storage unit 302 and reading of data therefrom is performed via the controller 301.

The controller 301 includes a root public key storage unit 303, a revocation list receiving unit 304, a key information receiving unit 305, a signature verification unit 306, a key information writing unit 307, a version verification unit 308, and a revocation list writing unit 309.

The root public key storage unit 303 stores the root public key that forms a key pair with the root private key stored by the key issuing authority 10. The root public key is used for verification of the digital signature generated by the key issuing authority 10. Note by way of example that the root public key storage unit 303 may be configured inside the controller 301 by hard logic.

The revocation list receiving unit 304 receives a revocation list 120 from the revocation list transmitting unit 201 of the memory card manufacturing device 20. The revocation list receiving unit 304 outputs the received revocation list 120 to the signature verification unit 306.

The key information receiving unit 305 receives the key information 130 from the key information transmitting unit 202 of the memory card manufacturing device 20. The key information receiving unit 305 outputs the received key information 130 to the signature verification unit 306.

The signature verification unit 306 performs signature verification by applying a predetermined signature verification algorithm to the digital signature 124 included in the revocation list 120, the digital signature 134 included in the key information 130, and the digital signature 137 included in the public key certificate 132, using the root public key stored by the root public key storage unit 303.

The key information writing unit 307 writes the key information 130 to the storage unit 302 when signature verification of the digital signature 134 included in the key information 130 and of the digital signature 137 included in the public key certificate 132 are successful.

The version verification unit 308 receives the revocation list 120 from the signature verification unit 306 and reads the version 121 from the received revocation list 120. The version verification unit 308 also reads the minimum version 133 from the key information 130 stored in the storage unit 302.

The version verification unit 308 determines whether the version 121 is older than the minimum version 133. When the version 121 of the revocation list 120 is older than the minimum version 133, the version verification unit 308 determines that a malicious attempt is being made to write an old revocation list and discards the revocation list 120, without outputting the revocation list 120 to the revocation list writing unit 309. When the version 121 of the revocation list 120 is the same as or newer than the minimum version 133, the version verification unit 308 outputs the revocation list 120 to the revocation list writing unit 309.

Upon receiving the revocation list 120 from the version verification unit 308, the revocation list writing unit 309 writes the received revocation list 120 in the storage unit 302.

<Operations>

Figure 6:
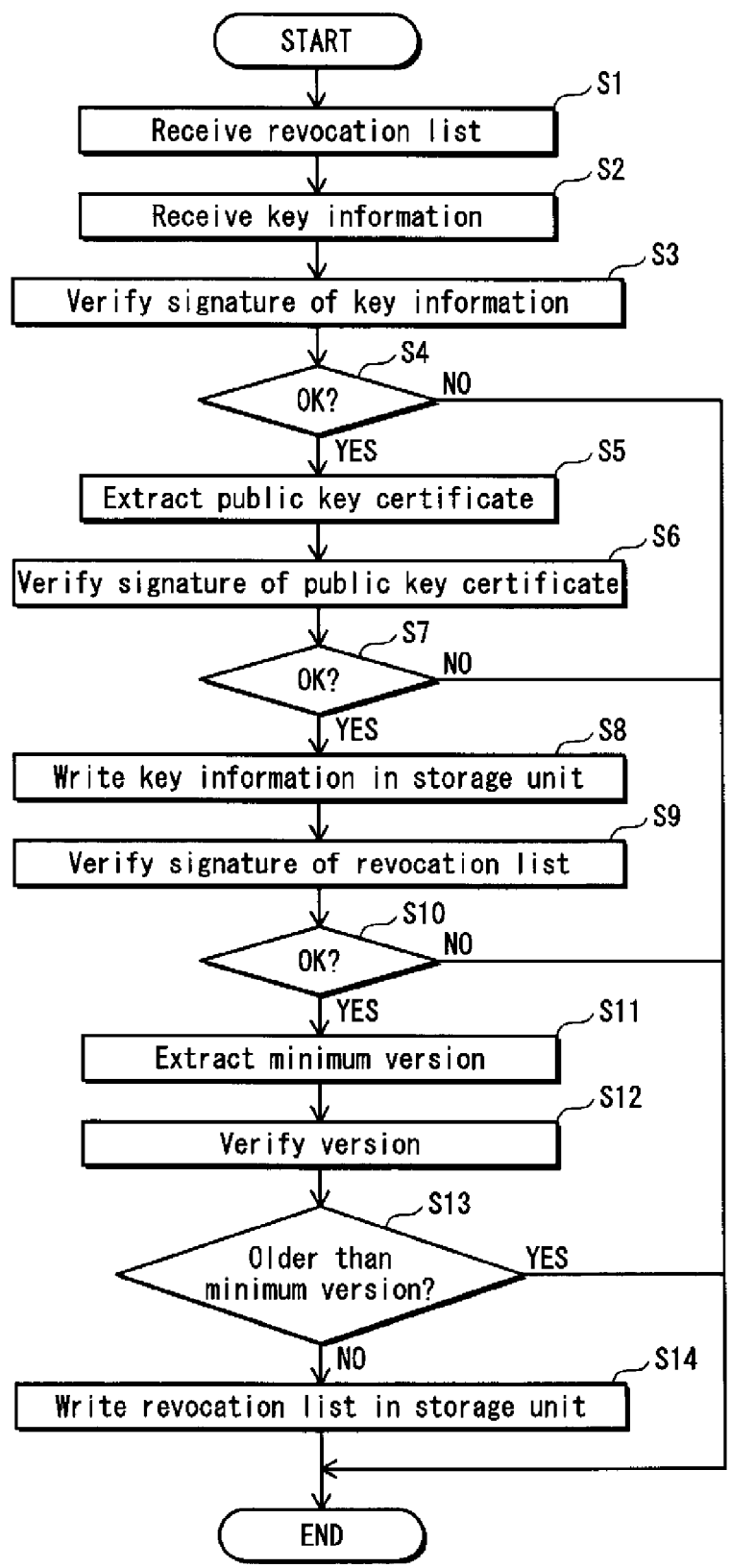
FIG. 6 is a flowchart showing writing operations by the memory card 30.

With reference to FIG. 6, the following describes operations by the controller 301 to write the key information and the revocation list.

The revocation list receiving unit 304 receives the revocation list (step S1). The key information receiving unit 305 receives the key information (step S2).

The signature verification unit 306 verifies the digital signature of the key information using the root public key stored by the root public key storage unit 303 (step S3). When signature verification fails (step S4: NO), the controller 301 terminates processing.

When signature verification is successful (step S4: YES), the signature verification unit 306 extracts the public key certificate from the key information (step S5) and verifies the digital signature of the public key certificate using the root public key (step S6). When signature verification fails (step S7: NO), the controller 301 terminates processing.

When signature verification is successful (step S7: YES), the key information writing unit 307 writes the key information in the storage unit 302 (step S8).

Next, the signature verification unit 306 verifies the digital signature of the revocation list received in step S1 using the root public key (step S9). When signature verification fails (step S10: NO), the controller 301 terminates processing.

When signature verification is successful (step S10: YES), the version verification unit 308 extracts the "minimum version" from the key information stored in the storage unit 302 (step S11). Furthermore, the version verification unit 308 reads the "version" from the revocation list. The version verification unit 308 verifies whether the version of the revocation list is older than the minimum version (step S12).

When the version of the revocation list is older than the minimum version (step S13: YES), the controller 301 terminates processing. When the version of the revocation list is the same as or newer than the minimum version (step S13: NO), the revocation list writing unit 309 writes the revocation list in the storage unit 302 (step S14).

<Modifications>

The following describes a memory card 30a as a Modification to the memory card 30 described in Embodiment 1.

Figure 7:
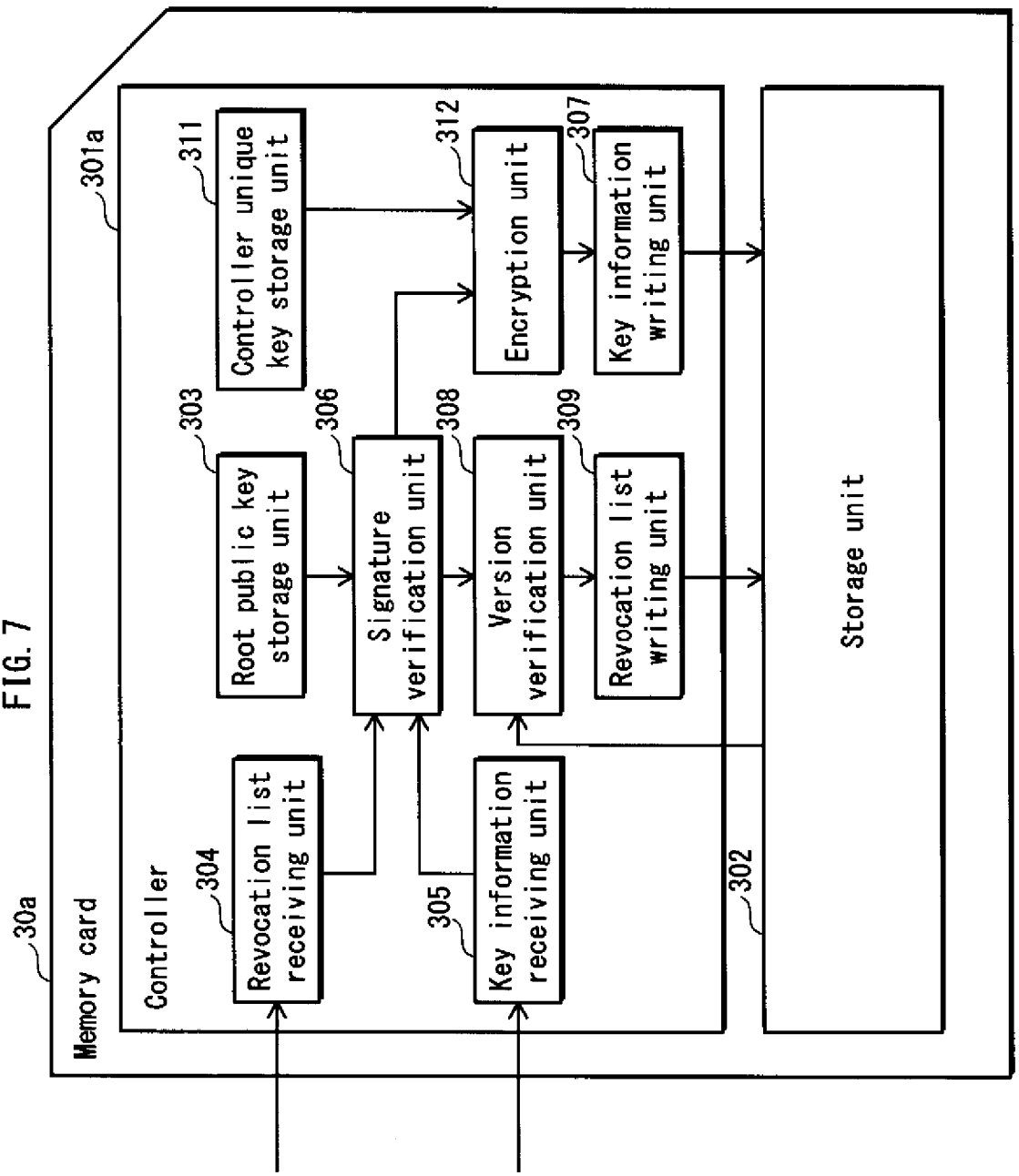

FIG. 7 is a block diagram showing the structure of the memory card 30a. The structural elements having the same functions as in the memory card 30 shown in FIG. 5 bear the same reference signs as in FIG. 5, and a description thereof is omitted.

A controller 301a in the memory card 30a according to the Modification includes, in addition to the structural elements of the controller 301, a controller unique key storage unit 311 and an encryption unit 312.

The controller unique key storage unit 311 stores a controller unique key, which is information unique to the controller 301a. The controller unique key is, for example, written after manufacturing of the controller 301a using technology called eFUSE, whereby a number that differs for each controller is engraved by being electrically burned into a part of the electronic circuit.

When succeeding in verification of the digital signature included in the key information, the signature verification unit 306 of the controller 301a outputs the key information to the encryption unit 312. The encryption unit 312 encrypts the private key included in the key information using the controller unique key stored in the controller unique key storage unit 311, thus generating an encrypted private key. The key information writing unit 307 writes key information composed of the encrypted private key, the public key certificate, the minimum version, and the digital signature in the storage unit 302.

In other words, the controller 301a according to the Modification writes a private key that has been encrypted in the storage unit 302. Since the key used for encryption is unique to the controller 301a, the encrypted private key stored in the storage unit 302 cannot be decrypted by a controller other than the controller 301a. Accordingly, security of the private key is heightened by using the controller 301a.

2. Embodiment 2

The following describes a content playback system 2 as Embodiment 2 of the present invention.

<Structure>

Figure 8:
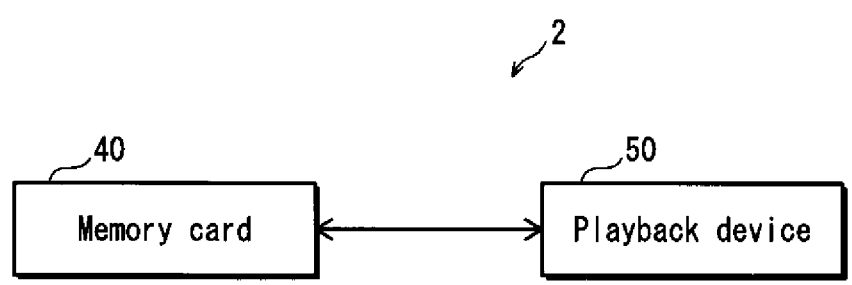
FIG. 8 shows the structure of a content playback system 2.

As shown in FIG. 8, the content playback system 2 is composed of a memory card 40 as an information processing device according to the present invention and a playback device 50 as an information processing device according to the present invention.

A digital content is recorded on the memory card 40. The playback device 50 is a device for reading the digital content from the memory card 40 and playing the digital content back.

The memory card 40 and the playback device 50 both store the PKI key pair and the revocation list issued by the key issuing authority 10 described in Embodiment 1. The memory card 40 and the playback device 50 transmit and receive the content via encrypted communication after performing mutual authentication using the key pair and the revocation list.

(1) Memory Card 40

Figure 9:
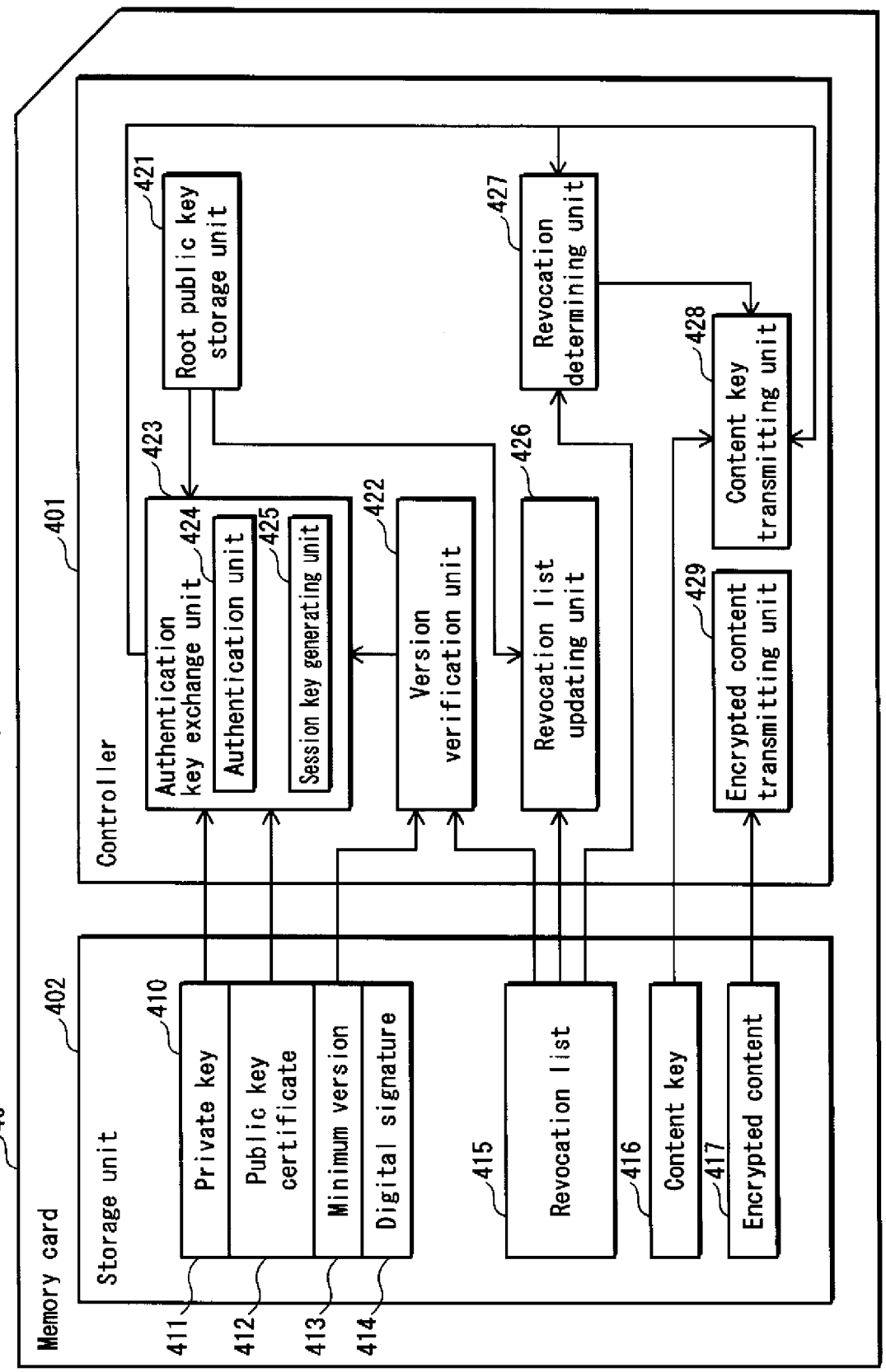
FIG. 9 is a block diagram showing the structure of a memory card 40.

As shown in FIG. 9, the memory card 40 includes a controller 401 and a storage unit 402.

The controller 401 is an LSI device. Processing internal to the controller 401 is kept secure, so that information cannot be read by an external device. The storage unit 402 is a flash memory. Writing of data to the storage unit 402 and reading of data therefrom is performed via the controller 401.

The storage unit 402 stores key information 410, a revocation list 415, a content key 416, and an encrypted content 417. The key information 410 is composed of a private key 411, a public key certificate 412, a minimum version 413, and a digital signature 414. The data structure of the public key certificate 412 is similar to that of the public key certificate 132 in FIG. 4, and the data structure of the revocation list 415 is similar to that of the revocation list 120 in FIG. 3. The private key 411 and the public key included in the public key certificate 412 form a PKI key pair. The encrypted content 417 is encrypted data generated by applying a predetermined encryption algorithm to plaintext content using the content key 416 as an encryption key.

The controller 401 includes a root public key storage unit 421, a version verification unit 422, an authentication key exchange unit 423, a revocation list updating unit 426, a revocation determining unit 427, a content key transmitting unit 428, and an encrypted content transmitting unit 429. The authentication key exchange unit 423 includes an authentication unit 424 and a session key generating unit 425.

The root public key storage unit 421 stores the root public key that forms a key pair with the root private key stored by the key issuing authority 10. The root public key is used for verification of the digital signature generated by the key issuing authority 10. Note by way of example that the root public key storage unit 421 may be configured inside the controller 401 by hard logic.

The version verification unit 422 verifies the authenticity of the revocation list 415 by comparing the minimum version included in the public key certificate 412 and the version included in the revocation list 415. Specifically, when the version of the revocation list is older than the minimum version, the version verification unit 422 determines that some sort of attack or malicious act has occurred and stops encrypted communication with the playback device 50. Note that the version verification by the version verification unit 422 may be performed each time the memory card 40 communicates with the playback device 50, or alternatively upon initialization or when updating the revocation list.

The authentication unit 424 uses the root public key stored by the root public key storage unit 421 to verify the digital signature included in the public key certificate received from the playback device 50.

Note that algorithms for signature generation and signature verification include the Digital Signature Algorithm (DSA), which is based on the difficulty of prime factorization, the Elliptic Curve Digital Signature Algorithm (EC-DSA), which is based on the discrete logarithm problem on elliptic curves, and the like. Either of these algorithms may be used, or another algorithm may be used. In Embodiment 2, by way of example, EC-DSA having a key length of 160 bits is used.

When, as a result of verification, the digital signature included in the public key certificate of the playback device 50 is determined not to be legitimate, the playback device 50 is considered to be a malicious device, and encrypted communication with the playback device 50 is stopped.

The authentication unit 424 also performs challenge-response authentication with the playback device 50. Details on challenge-response authentication are provided below. When the challenge-response authentication fails, it is considered that either the playback device 50 is a malicious device, or the communication channel received some form of attack, and encrypted communication with the playback device 50 is stopped.

The session key generating unit 425 generates a session key that is shared with the playback device 50 using information generated by the authentication unit 424 during the challenge-response authentication, information received from the playback device 50, and the like. The specific generation method of the session key is described below.

The revocation list updating unit 426 and the playback device 50 transmit their respectively stored revocation lists to each other and receive the other device's revocation list. Before transmitting the revocation list 415, the revocation list updating unit 426 encrypts the revocation list 415 with the session key generated by the session key generating unit 425. Furthermore, since the revocation list received from the playback device 50 has been encrypted with a session key generated by the playback device 50, the revocation list updating unit 426 decrypts the received revocation list with the session key generated by the session key generating unit 425.

In this Embodiment, Advanced Encryption Standard (AES) is used as the encryption algorithm. However, the encryption algorithm used here is not limited to AES, and another algorithm may be used as long as the algorithm is a shared key encryption method with a sufficient key length. Furthermore, a method other than encryption, such as Message Authentication Code (MAC), may be used, as long as the method can prevent an attack in which the revocation list is replaced with an old version (referred to as a "rollback attack").

Furthermore, the revocation list updating unit 426 may transmit and receive the entire revocation list, or may at first transmit and receive only the "version" included in the revocation list and subsequently transmit and receive the entire revocation list as necessary. In this case, the revocation list updating unit 426 may encrypt the version using the session key before transmitting the version and then, when transmitting the remaining data in the revocation list, transmit the data as plaintext without encryption. In this way, processing to encrypt the entire revocation list, which represents a large amount of data, is omitted.

The revocation list updating unit 426 compares the version of the revocation list 415 stored by the memory card 40 and the version of the revocation list stored by the playback device 50. When the revocation list stored by the playback device 50 is determined to be newer, the revocation list updating unit 426 updates the revocation list 415 stored in the storage unit 402 to the revocation list received from the playback device 50.

Note that before updating the revocation list in the updating unit 402, the revocation list updating unit 426 may verify the digital signature included in the revocation list received from the playback device 50 using the root public key. In this case, the revocation list updating unit 426 updates the revocation list 415 in the storage unit 402 only when signature verification is successful. When signature verification fails, the revocation list updating unit 426 does not update the revocation list 415 but rather considers the received revocation list to be malicious and discards the received revocation list.

The revocation determining unit 427 determines whether the certificate ID included in the public key certificate received from the playback device 50 is included in the revocation list stored in the storage unit 402. When the certificate ID of the playback device 50 is included in the revocation list, the controller 401 cuts off encrypted communication and transmission of the content, since the playback device 50 is a malicious device.

When mutual authentication by the authentication unit 424 and revocation determining by the revocation determining unit 427 are completed normally, the content key transmitting unit 428 reads the content key 416 from the storage unit 402. The content key transmitting unit 428 encrypts the content key 416 with the session key to generate an encrypted content key and transmits the encrypted content key to the playback device 50. In this Embodiment, AES is used by way of example as the encryption algorithm.

The encrypted content transmitting unit 429 reads the encrypted content 417 from the storage unit 402 and transmits the encrypted content 417 to the playback device 50.

(2) Playback Device 50

Figure 10:
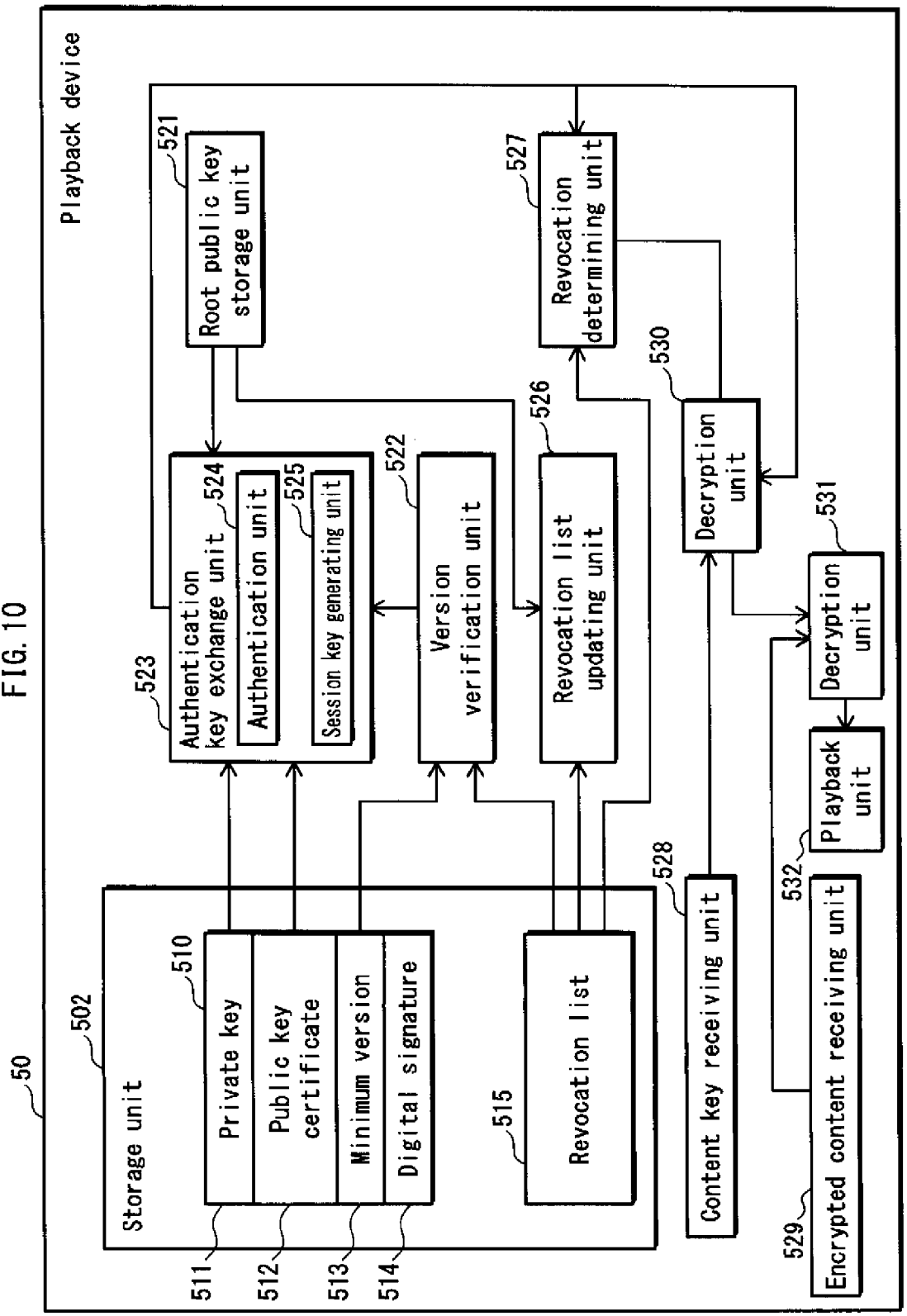
FIG. 10 is a block diagram showing the structure of a playback device 50.

As shown in FIG. 10, the playback device 50 includes a storage unit 502, a root public key storage unit 521, a version verification unit 522, an authentication key exchange unit 523, a revocation list updating unit 526, a revocation determining unit 527, a content key receiving unit 528, an encrypted content receiving unit 529, a decryption unit 530, a decryption unit 531, and a playback unit 532.

The authentication key exchange unit 523 includes an authentication unit 524 and a session key generating unit 525.

The playback device 50 is specifically a computer system provided with a processor, a hard disk, ROM, RAM, and the like. Computer programs are stored on the ROM, and the playback device 50 achieves its functions by the processor using the RAM to execute the computer programs.

The storage unit 502 stores key information 510 and a revocation list 515. The key information 510 is composed of a private key 511, a public key certificate 512, a minimum version 513, and a digital signature 514. The data structure of the public key certificate 512 is similar to that of the public key certificate 132 in FIG. 4, and the data structure of the revocation list 515 is similar to that of the revocation list 120 in FIG. 3. The private key 511 and the public key included in the public key certificate 512 form a PKI key pair.

The root public key storage unit 521 stores the root public key that forms a key pair with the root private key stored by the key issuing authority 10. The root public key is used for verification of the digital signature generated by the key issuing authority 10.

The version verification unit 522 verifies the authenticity of the revocation list 515 by comparing the minimum version included in the public key certificate 512 and the version included in the revocation list 515. Specifically, when the version of the revocation list is older than the minimum version, the version verification unit 522 determines that some sort of attack or malicious act has occurred and stops encrypted communication with the memory card 40. Note that the version verification by the version verification unit 522 may be performed each time the playback device 50 communicates with the memory card 40, or alternatively upon initialization or when updating the revocation list.

The authentication unit 524 uses the root public key stored by the root public key storage unit 521 to verify the digital signature included in the public key certificate received from the memory card 40. In this Embodiment, EC-DSA is used as the algorithm for signature generation and signature verification.

When, as a result of verification, the digital signature included in the public key certificate of the memory card 40 is determined not to be legitimate, the memory card 40 is considered to be a malicious device, and encrypted communication with the memory card 40 is stopped.

The authentication unit 524 also performs challenge-response authentication with the memory card 40. Details on challenge-response authentication are provided below. When the challenge-response authentication fails, it is considered that either the memory card 40 is a malicious device, or the communication channel received some form of attack, and encrypted communication with the memory card 40 is stopped.

The session key generating unit 525 generates a session key that is shared with the memory card 40 using information generated by the authentication unit 524 during the challenge-response authentication, information received from the memory card 40, and the like. The specific generation method of the session key is described below.

The revocation list updating unit 526 and the memory card 40 transmit their respectively stored revocation lists to each other and receive the other device's revocation list. When transmitting the revocation list 515, the revocation list updating unit 526 transmits the revocation list 515 after encryption with the session key generated by the session key generating unit 525. Furthermore, the revocation list received from the memory card 40 has been encrypted with the session key generated by the memory card 40, and therefore the revocation list updating unit 526 decrypts the received revocation list with the session key generated by the session key generating unit 525. In this Embodiment, AES is used as the encryption algorithm.

Furthermore, the revocation list updating unit 526 may transmit and receive the entire revocation list, or may at first transmit and receive only the "version" included in the revocation list and subsequently transmit and receive the entire revocation list as necessary. In this case, the revocation list updating unit 526 may, like the revocation list updating unit 426 in the memory card 40, encrypt the version using the session key before transmitting the version and then, when transmitting the remaining data in the revocation list, transmit the data as plaintext without encryption.

The revocation list updating unit 526 compares the version of the revocation list 515 stored by the playback device 50 and the version of the revocation list stored by the memory card 40. When the revocation list stored by the memory card 40 is determined to be newer, the revocation list updating unit 526 updates the revocation list 515 stored in the storage unit 502 to the revocation list received from the memory card 40.

Note that before updating the revocation list in the updating unit 502, the revocation list updating unit 526 may verify the digital signature included in the revocation list received from the memory card 40 using the root public key. In this case, the revocation list updating unit 526 updates the revocation list 515 in the storage unit 502 only when signature verification is successful. When signature verification fails, the revocation list updating unit 526 does not update the revocation list 515 but rather considers the received revocation list to be malicious and discards the received revocation list.

The revocation determining unit 527 determines whether the certificate ID included in the public key certificate received from the memory card 40 is included in the revocation list stored in the storage unit 502. When the certificate ID of the memory card 40 is included in the revocation list, the playback device 50 stops encrypted communication and decryption of encrypted content, since the memory card 40 is a malicious device.

The content key receiving unit 528 receives the encrypted content key from the memory card 40. The encrypted content key is the data of the content key 416 encrypted with the session key.

The encrypted content receiving unit 529 receives the encrypted content from the memory card 40. The encrypted content is the data of the content encrypted with the content key.

When mutual authentication by the authentication unit 524 and revocation determining by the revocation determining unit 427 are completed normally, the decryption unit 530 decrypts the encrypted content key received by the content key receiving unit 528 with the session key, thus generating the content key. In this Embodiment, AES is used as the encryption algorithm.

The decryption unit 531 receives the content key from the decryption unit 530 and receives the encrypted content from the encrypted content receiving unit 529. The decryption unit 531 decrypts the encrypted content using the content key, thus generating the content.

The playback unit 532 performs processing such as decoding on the content decrypted by the decryption unit 531 and outputs the result to an external display not shown in the figures.

<Operations>

The following describes the operations of the content playback system 2 with reference to the flowcharts in FIGS. 11-14.

The authentication unit 524 of the playback device 50 generates a 160-bit random value Hn (Host nonce) (step S101). Note that in Embodiment 2, a 160-bit random value is generated because use of EC-DSA with a 160-bit key length is assumed. When using another algorithm, the random value generated in this step obviously need not be 160 bits.

The authentication unit 524 adds the public key certificate 512 stored by the storage unit 502 to the 160-bit random value generated in step S101. The playback device 50 transmits the result to the memory card 40 as challenge data (step S102). Note that in FIG. 11, the public key certificate 512 is indicated as "Hcert" (Host Certificate). Furthermore, the symbol ∥ indicates concatenation.

Upon receiving the challenge data from the playback device 50, the version verification unit 422 in the memory card 40 performs version verification (step S103). Details on the version verification are provided below.

When it is determined during version verification that the revocation list is malicious (step S104: NO), the memory card 40 stops processing. When it is determined during version verification that the revocation list is legitimate (step S104: YES), processing proceeds to step S105.

The authentication unit 424 verifies the public key certificate Hcert included in the challenge data received in step S102 using the root public key (step S105). When verification of the public key certificate Hcert fails (step S106: NO), the memory card 40 stops processing. When verification of the public key certificate Hcert is successful (step S106: YES), the authentication unit 424 generates a 160-bit random value Mn (Media nonce) (step S107).

The authentication unit 424 adds the public key certificate 412 stored by the storage unit 402 to the 160-bit random value Hn generated in step S107. The memory card 40 transmits the result as challenge data to the playback device 50 (step S108). Note that in FIG. 11, the public key certificate 412 is indicated as "Mcert" (Media Certificate).

Upon receiving the challenge data from the memory card 40, the version verification unit 522 in the playback device 50 performs version verification (step S109). Details on the version verification are provided below.

When it is determined during version verification that the revocation list is malicious (step S110: NO), the playback device 50 stops processing. When it is determined during version verification that the revocation list is legitimate (step S110: YES), processing proceeds to step S117.

After the challenge data is transmitted in step S108, the authentication unit 424 of the memory card 40 generates a 160-bit random value Mk (Media Key) (step S113). Note that when using an algorithm other than EC-DH, the random value generated in step S113 is not limited to 160 bits.

For the random value Mk generated in step S113, the authentication unit 424 calculates Mv=Mk·G using a base point G which, in this system, is a predetermined parameter of elliptic curve cryptography (step S114).

Furthermore, the authentication unit 424 generates a digital signature (Sign(Mpriv, Hn||Mv)) for Hn||Mv using the private key (Mpriv) 411 stored in the storage unit 402, the data Hn||Mv being a concatenation of Hn included in the challenge data received in step S102 and Mv calculated in step S114 (step S115).

The authentication unit 424 transmits to the playback device 50, as response data, a concatenation of Mv calculated in step S114 and the digital signature Sign(Mpriv, Hn||Mv) generated in step S115 (step S116).

The playback device 50 receives the response data from the memory card 40. The authentication unit 524 verifies the digital signature Sign(Mpriv, Hn||Mv) included in the received response data (step S117). Specifically, the authentication unit 524 extracts Mv from the received response data and verifies the digital signature for the concatenation of Hn, generated in step S101, and Mv using the public key included in the public key certificate Mcert of the memory card 40.

When verification of the digital signature fails (step S118: NO), the playback device 50 stops processing. When verification of the digital signature is successful (step S118: YES), the authentication unit 524 generates a 160-bit random value Hk (host key) (step S119).

For the random value Hk generated in step S119, the authentication unit 524 calculates Hv=Hk·G using the base point G which, in this system, is a predetermined parameter of elliptic curve cryptography (step S120).

Furthermore, the authentication unit 524 generates a digital signature (Sign(Hpriv, Mn||Hv)) for Mn||Hv using the private key (Hpriv) 511 stored in the storage unit 502, the data Mn||Hv being a concatenation of Mn included in the challenge data received in step S108 and Hv calculated in step S120 (step S121).

The authentication unit 524 transmits to the memory card 40, as response data, a concatenation of Hv calculated in step S120 and the digital signature Sign(Hpriv, Mn||Hv) generated in step S121 (step S122).

The memory card 40 receives the response data from the playback device 50. The authentication unit 424 verifies the digital signature Sign(Hpriv, Mn||Hv) included in the received response data (step S123). Specifically, the authentication unit 424 extracts Hv from the received response data and verifies the digital signature for the concatenation of Mn, generated in step S108, and Hv using the public key included in the public key certificate Hcert of the playback device 50.

When verification of the digital signature fails (step S124: NO), the memory card 40 stops processing. When verification of the digital signature is successful (step S124: YES), the session key generating unit 425 generates a session key Bk (Bus Key) by calculating Bk=Mk·Hv from the random value Mk generated in step S113 and Hv included in the response data received in step S112 (step S125).

The session key generating unit 525 of the playback device 50 similarly generates a session key Bk by calculating Bk=Hk·Mv from the random value Hk generated in step S119 and Mv included in the response data received in step S116 (step S126).

Next, the revocation list updating unit 426 of the memory card 40 encrypts the revocation list 415 (Mcrl) stored in the storage unit 402 using the session key Bk generated in step S125 to generate an encrypted revocation list Enc(Bk, Mcrl) (step S127). The revocation list updating unit 426 transmits the encrypted revocation list Enc(Bk, Mcrl) to the playback device 50 (step S128).

Similarly, the revocation list updating unit 526 of the playback device 50 encrypts the revocation list 515 (Hcrl) stored in the storage unit 502 using the session key Bk generated in step S126 to generate an encrypted revocation list Enc(Bk, Hcrl) (step S129). The revocation list updating unit 526 transmits the encrypted revocation list Enc(Bk, Hcrl) to the memory card 40 (step S130).

The revocation list updating unit 526 decrypts the Enc(Bk, Mcrl) received in step S128 using the session key Bk (step S131).

The revocation list updating unit 426 decrypts the Enc(Bk, Hcrl) received in step S130 using the session key Bk (step S132).

Next, the revocation list updating unit 426 compares the version of the Mcrl and the version of the Hcrl (step S133).

When the version of the Mcrl is newer than the version of the Hcrl, there is no need for updating (step S134: NO), and processing proceeds to step S143.

When the version of the Hcrl is newer than the version of the Mcrl, updating is required (step S134: YES), but before updating, the revocation list updating unit 426 verifies the digital signature included in the Hcrl using the root public key (step S135). When signature verification fails (step S136: NO), updating is not performed, and processing proceeds to step S143. When signature verification is successful (step S136: YES), the revocation list updating unit 426 updates the revocation list Mcrl stored in the storage unit 402 with the revocation list Hcrl received from the playback device 50 (step S137).

Similarly, the revocation list updating unit 526 of the playback device 50 compares the version of the Mcrl and the version of the Hcrl (step S138).

When the version of the Hcrl is newer than the version of the Mcrl, there is no need for updating (step S139: NO), and processing proceeds to step S148.

When the version of the Mcrl is newer than the version of the Hcrl, updating is required (step S139: YES), but before updating, the revocation list updating unit 526 verifies the digital signature included in the Mcrl using the root public key (step S140). When signature verification fails (step S141:

NO), updating is not performed, and processing proceeds to step S148. When signature verification is successful (step S141: YES), the revocation list updating unit 526 updates the revocation list Hcrl stored in the storage unit 502 with the revocation list Mcrl received from the memory card 40 (step S142).

Next, the revocation determining unit 427 of the memory card 40 confirms the validity of the public key certificate Hcert of the playback device 50 using the revocation list stored in the storage unit 402 (step S143). Specifically, the revocation determining unit 427 determines whether the certificate ID of the Hcert is recorded in the revocation list.

When the certificate ID of the Hcert is recorded in the revocation list (step S144: NO), the playback device 50 is considered a malicious device, and the memory card 40 stops processing.

When the certificate ID of the Hcert is not recorded in the revocation list (step S144: YES), the content key transmitting unit 428 reads the content key from the storage unit 402 (step S145). The content key transmitting unit 428 encrypts the session key Bk generated in step S125 to generate an encrypted content key Enc(Bk, Kc) (step S146). Next, the encrypted content transmitting unit 429 reads the encrypted content from the storage unit 402 (step S147).

The content key transmitting unit 428 transmits the encrypted content key Enc(Bk, Kc) to the playback device 50, and the encrypted content transmitting unit 429 transmits encrypted content Enc(Kc, Cont) to the playback device 50 (step S148).

The content key receiving unit 528 of the playback device 50 receives the encrypted content key Enc(Bk, Kc), and the encrypted content receiving unit 529 receives the encrypted content Enc(Kc, Cont).

Next, the revocation determining unit 527 of the memory card 50 confirms the validity of the public key certificate Mcert of the memory card 40 using the revocation list stored in the storage unit 502 (step S149). Specifically, the revocation determining unit 527 determines whether the certificate ID of the Mcert is recorded in the revocation list.

When the certificate ID of the Mcert is recorded in the revocation list (step S150: NO), the memory card 40 is considered a malicious device, and the playback device 50 stops processing.

When the certificate ID of the Mcert is not recorded in the revocation list (step S150: YES), the decryption unit 530 decrypts the encrypted content key using the session key Bk generated in step S126, thus generating the content key (step S151). Next, the decryption unit 531 decrypts the encrypted content using the content key generated in step S151, thus generating the content (step S152). The playback unit 532 then plays back the content (step S153).

Figure 11:
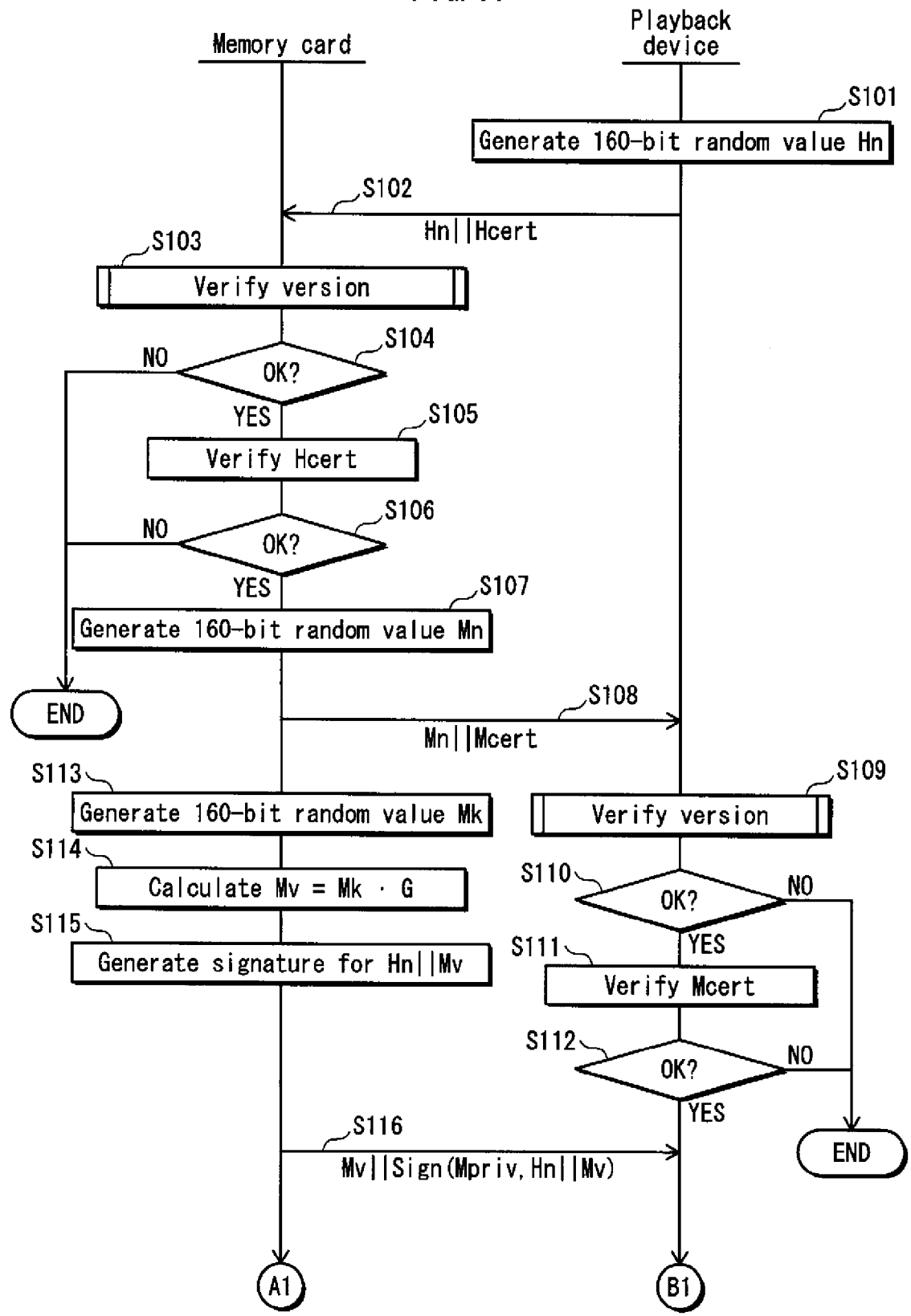
FIG. 11 is a flowchart showing authentication key exchange between the memory card 40 and the playback device 50 and operations for content transmission and reception.
Figure 12:
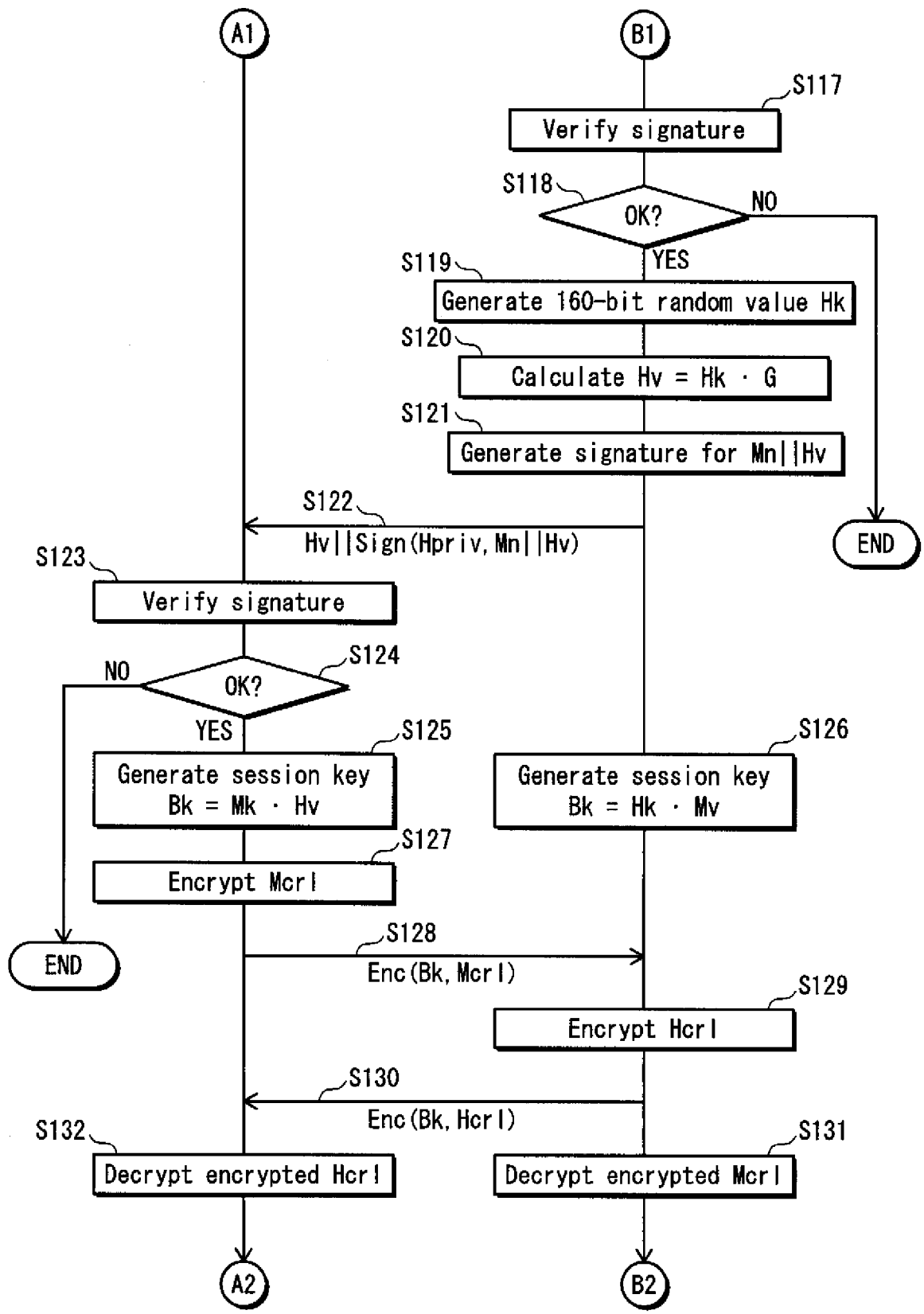
FIG. 12 is a flowchart showing authentication key exchange between the memory card 40 and the playback device 50 and operations for content transmission and reception.
Figure 13:
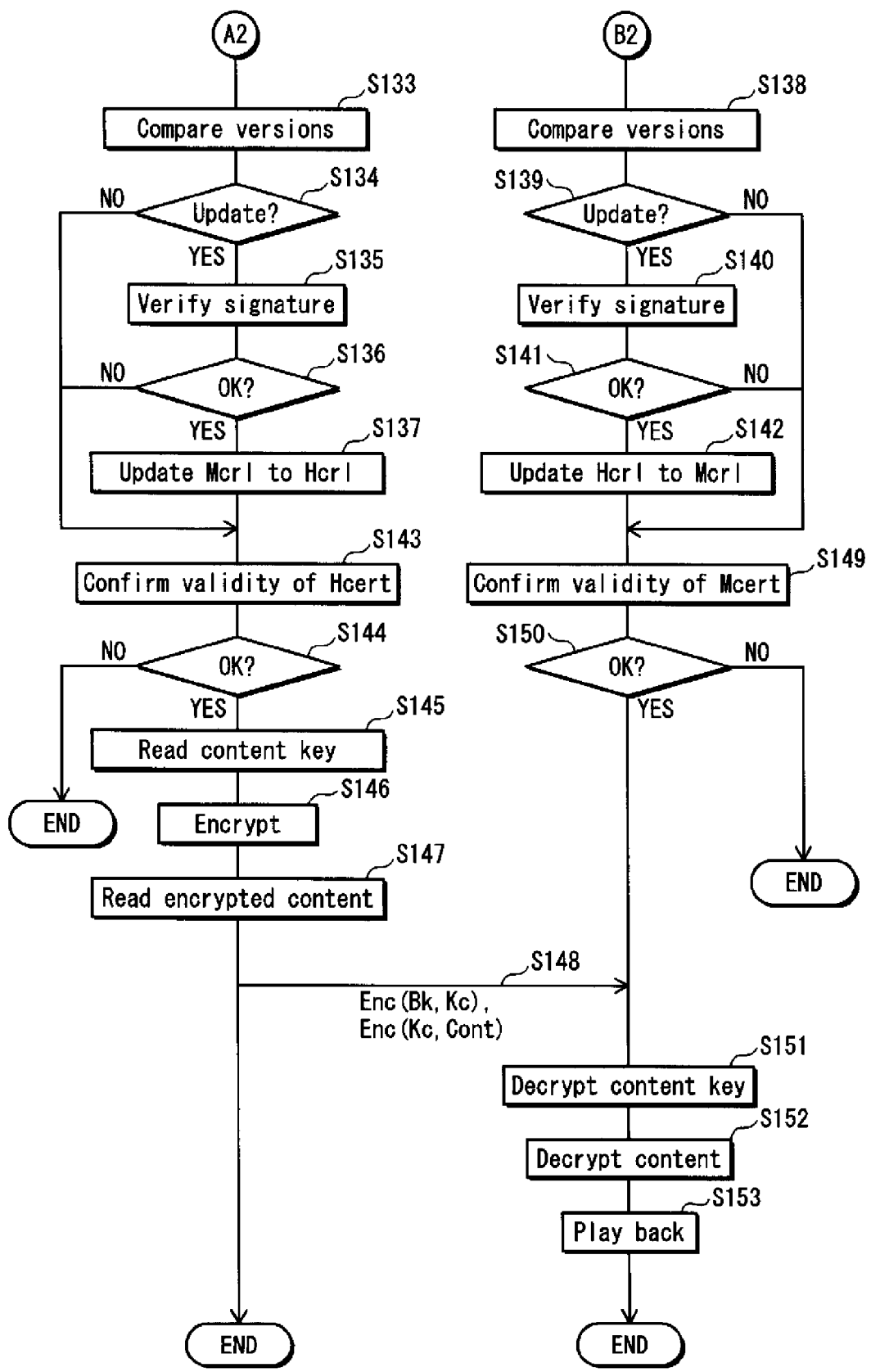
FIG. 13 is a flowchart showing authentication key exchange between the memory card 40 and the playback device 50 and operations for content transmission and reception.
Figure 14:
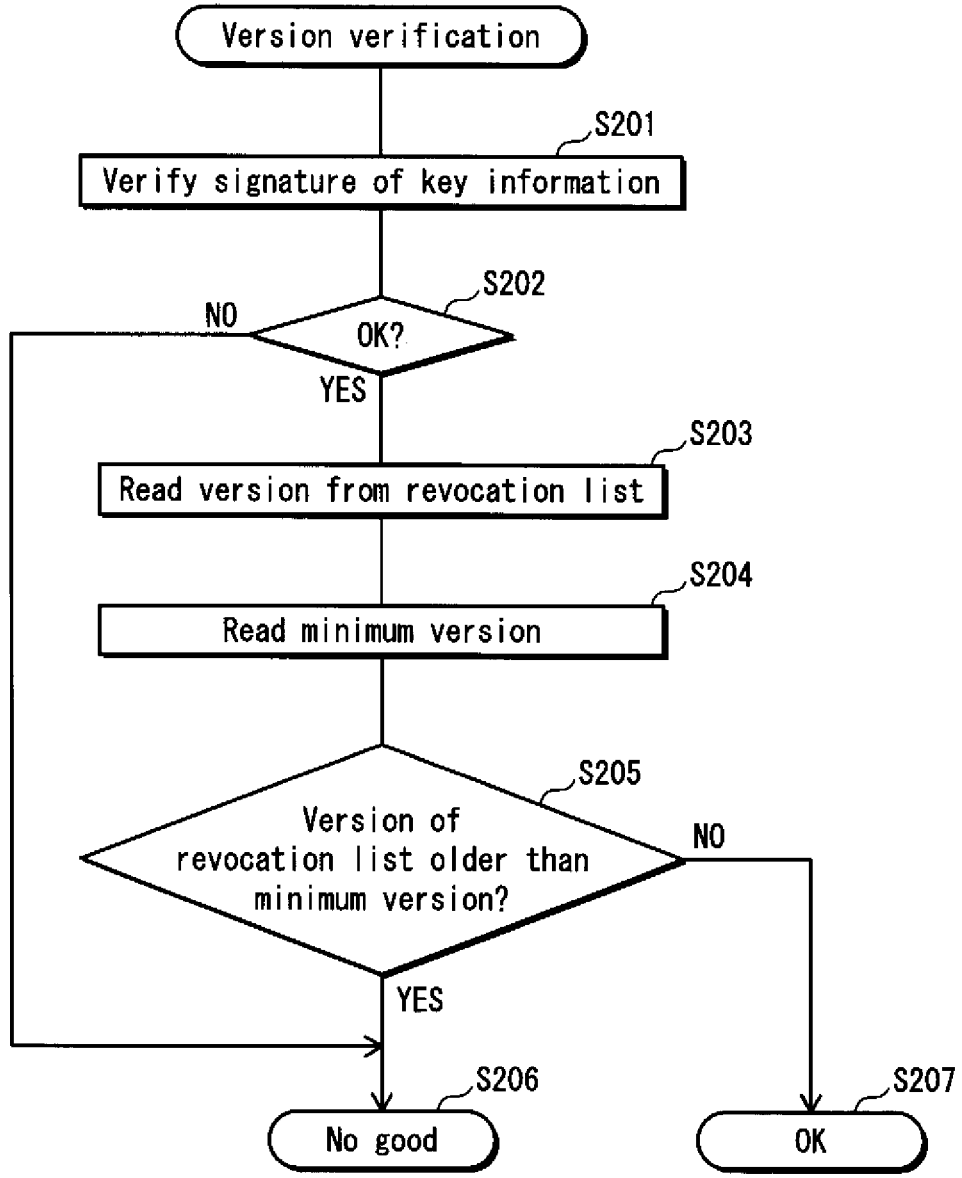
FIG. 14 is a flowchart showing version verifying operations by the memory card 40 and the playback device 50.

Finally, using FIG. 14, details on the version verification in step S103 and step S109 of FIG. 11 are provided.

The processing shown in FIG. 14 is performed by the version verification unit 422 of the memory card 40 and the version verification unit 522 of the playback device 50. Since the version verification units 422 and 522 perform similar processing, reference sign numbers are omitted here for the sake of convenience.

The version verification unit reads the key information stored in the storage unit and verifies the digital signature included in the key information (step S201). When signature verification fails (step S202: NO), processing proceeds to step S206). When signature verification is successful (step S202: YES), the version verification unit reads the "version" from the revocation list stored in the storage unit (step S203).

Furthermore, the version verification unit reads the "minimum version" from the key information (step S202).

The version verification unit determines whether the version of the revocation list is older than the minimum version. When the version of the revocation list is older than the minimum version (step S205: YES), the version verification unit determines that the revocation list is malicious (step S206). When the version of the revocation list is the same as or newer than the minimum version (step S205: NO), the version verification unit determines that the revocation list is legitimate (step S207).

By comparing the version of the revocation list and the minimum version, the version verification unit verifies the legitimacy of the revocation list. If the minimum version itself is tampered with, however, the effectiveness of version verification is lost. Therefore, before comparing the version of the revocation list and the minimum version, the version verification unit is made to verify the digital signature of the key information, thus verifying that the minimum version was generated by the key issuing authority in association with the key information.

<Modifications>

The following describes a memory card 40a as a Modification to the memory card 40 described in Embodiment 2.

Figure 15:
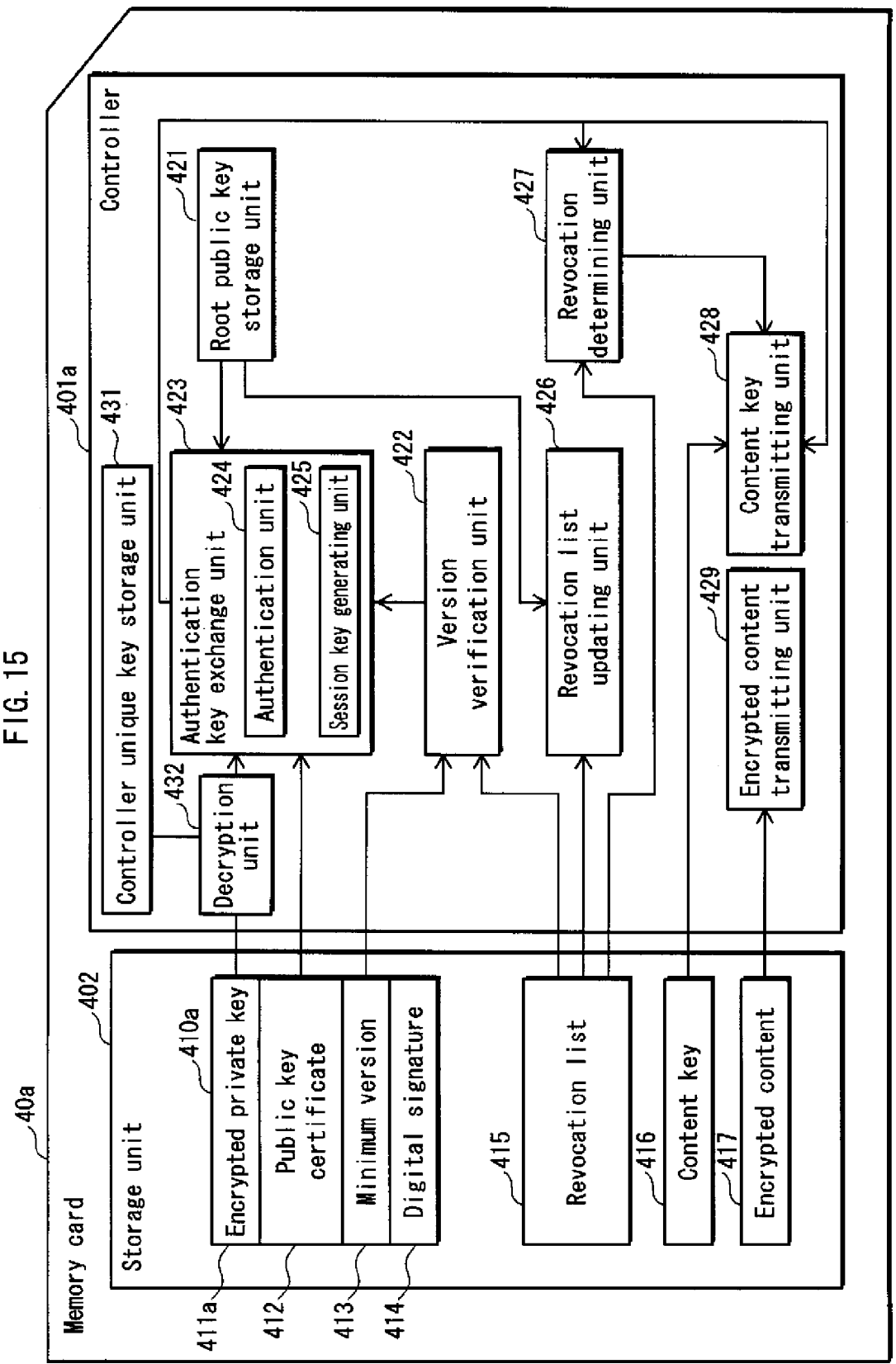

FIG. 15 is a block diagram showing the structure of the memory card 40a. The structural elements having the same functions as in the memory card 40 shown in FIG. 9 bear the same reference signs as in FIG. 9, and a description thereof is omitted.

A controller 401a in the memory card 40a according to the Modification includes, in addition to the structural elements of the controller 401, a controller unique key storage unit 431 and a decryption unit 432. The controller unique key storage unit 431 stores a controller unique key, which is information unique to the controller 401a. The controller unique key is, for example, written after manufacturing of the controller 401a using technology called eFUSE, whereby a number that differs for each controller is engraved by being electrically burned into a part of the electronic circuit.

The key information 410a in the Modification includes an encrypted private key 411a, which is the private key encrypted with the controller unique key The decryption unit 432 decrypts the encrypted private key using the controller key and outputs the decrypted private key to the authentication unit 424.

In other words, the memory card 40a according to the Modification stores an encrypted private key in the storage unit 402, and the decryption unit 432 decrypts the encrypted private key when the authentication unit 424 is to use the private key. Since the plaintext private key is not output to a device external to the controller 401a, security of the private key is heightened by using the controller 401a.

<Other Modifications>

(1) In Embodiments 1 and 2, the "version" of the revocation list is used as the minimum version, but the present invention is not limited in this way. The minimum version may be indicated by the issue date of the latest revocation list that has been issued, the count of certificate IDs registered in the latest revocation list, the size of the latest revocation list, or the like.

(2) In Embodiments 1 and 2, the root public key is stored in the controller, but such a structure is not essential. The root public key may be written by the memory card manufacturer in a storage unit (flash memory) and stored therein.

(3) In Embodiment 1, as described in FIG. 6, after writing the key information 130 in the storage unit 302 in step S8, version verification of the revocation list 120 is performed in step S12. The present invention is not, however, limited in this way. Before writing the key information 130 in the storage unit 302, the controller 301 may verify the version of the revocation list 120. As a result of the version verification, when it is determined that the version of the revocation list 120 is older than the minimum version, the controller 301 may discard the revocation list 120 without outputting the revocation list 120 to the revocation list writing unit 309 and also discard the key information 130 without outputting the key information 130 to the key information writing unit 307.

(4) In Embodiment 2, the host device that communicates with the memory card is a playback device that plays back content data. However, the host device that communicates with the memory card is not limited to a playback device and may, for example, be a recording device that records content data in the storage unit of the memory card.

(5) During version verification in Embodiment 2, when the version verification unit determines that the version of the revocation list is older than the minimum version, the session key generating unit may generate a session key, and the revocation list updating unit may update the revocation list. From a security standpoint, this method is not advisable, since there exists a danger of an attack to roll back the version. However, this method is useful for recovery when the revocation list stored in the storage unit is damaged for some reason.

(6) In Embodiment 2, when the memory card 40 and the playback device 50 transmit their respectively stored revocation lists to each other and receive the other device's revocation list, each device transmits the revocation list after encryption with the session key. However, this structure is not essential to the present invention. As shown in FIG. 3, a digital signature issued by the key issuing authority is added to the revocation list. Since tampering with the revocation list can therefore be detected by verification of the digital signature, from the standpoint of tampering prevention the revocation list may be transmitted without prior encryption.

(7) In Embodiment 2, before the challenge-response authentication shown in the flowcharts of FIGS. 11-14, the memory card 40 and the playback device 50 may verify the digital signature of their respectively stored revocation lists.

The revocation list verification unit that verifies the digital signature of the revocation list uses the root public key to verify the digital signature included in the revocation list stored in the storage unit. When signature verification fails, it may be considered that some sort of malicious act or attack has occurred in the device, and the device may stop encrypted communication with the other device.

(8) In Embodiment 2, before the revocation determining shown in the flowcharts of FIGS. 11-14 (step S143 and step S149), each device may verify the digital signature of the revocation list stored therein. Processing in steps S143 and S149 may be performed only when verification of the digital signature is successful, and when verification fails, control may be performed to stop transmission and reception of content until a legitimate revocation list is acquired.

(9) The challenge-response authentication described with reference to FIGS. 11-14 is only one example. A message transmitted and received between the memory card and the playback device may be divided into a plurality of parts to increase the number of transmissions between the memory card and the playback device. Furthermore, the order of processing is not limited to the specific example shown in FIGS. 11-14. The order of processing may be changed.

(10) In Embodiment 2, the version verification unit 422 of the memory card 40 performs version verification by comparing the version of the revocation list stored in the storage unit 402 of the memory card 40 and the minimum version included in the key information of the memory card 40. The present invention is not limited, however, to this structure. The version verification unit 422 may perform version verification by comparing the version of the revocation list received from the playback device 50 and the minimum version 413 included in the key information 410 of the memory card 40.

Similarly, the version verification unit 522 of the playback device 50 may perform version verification by comparing the version of the revocation list received from the memory card 40 and the minimum version 513 included in the key information 510 of the playback device 50.

(11) The above Embodiments and Modifications may be combined with one another.

<Supplementary Explanation>

As another Embodiment of the present invention, the following describes an information processing device and Modifications thereto, as well as the advantageous effects achieved thereby.

(a) An information processing device according to an embodiment of the present invention is an information processing device for performing authentication and key exchange using key information, the information processing device comprising: a storage unit storing the key information and a latest version in association with the key information, the key information and the latest version being issued by a key issuing authority, and the latest version indicating a version of a latest revocation list that has been issued when the key information is generated; a revocation list receiving unit operable to receive a revocation list having a version; a comparison unit operable to compare the version of the revocation list received by the revocation list receiving unit and the latest version; and a control unit operable to prevent predetermined processing when the version of the revocation list is older than the latest version.

Note that the "key information" mentioned in the "Supplementary Explanation" is described in Embodiments 1 and 2 as a "key pair" formed by a private key and a public key.

With the above structure, the information processing device prevents processing using an old version of the revocation list.

Even if a manufacturer writes an old version of the revocation list on the information processing device, the control unit of the information processing device prohibits predetermined processing. Accordingly, an information processing device that does not operate normally is manufactured. Therefore, with the above structure, it is expected that manufacturers will write a new revocation list on the information processing device in order to prevent manufacture of an information processing device that does not operate normally.

(b) In the information processing device, the storage unit further stores verification information used in verifying the association between the key information and the latest version, the information processing device further comprises a verification unit operable to verify, by using the verification information, the association between the latest version and the key information, and the comparison unit compares the version of the revocation list received by the revocation list receiving unit and the latest version when the verification unit affirmatively verifies the association between the latest version and the key information.

If the version information itself has maliciously been tampered with, the effectiveness of processing by the comparison unit and the control unit is lost.

Therefore, before processing by the comparison unit, the information processing device uses the verification information to verify whether the version information is associated with the key information issued by the key issuing authority, thereby guaranteeing the effectiveness of the processing by the comparison unit and the control unit. Note that as a specific example of the verification information, a digital signature generated with the private key of the key issuing authority for a concatenation of the key information and the version information may be used.

(c) The information processing device further comprises: a revocation list writing unit operable to write the revocation list received by the revocation list receiving unit in the storage unit; and a revocation determining unit operable to determine, using the revocation list stored in the storage unit, whether another device has been revoked, wherein the control unit prohibits writing of the revocation list by the revocation list writing unit when the version of the revocation list is older than the latest version.

With this structure, the manufacturer of the information processing device is prevented from mistakenly or purposely storing an old version of the revocation list on the information processing device. Furthermore, revocation determining using an old version of the revocation list is prohibited.

(d) The information processing device further comprises: a unique key storage unit storing a unique key; an encryption unit operable to encrypt at least a part of the key information issued by the key issuing authority using the unique key stored in the unique key storage unit; and a key information writing unit operable to write, in the storage unit, the key information that has at least a part thereof encrypted.

This structure heightens the security of the key information, since the encrypted part of the key information cannot be decrypted by another information processing device.

(e) The information processing device further comprises: an authentication key exchange unit operable to perform authentication and key exchange with another device using the key information, wherein the storage unit further stores a revocation list having a version, the revocation list receiving unit receives the revocation list by reading the revocation list from the storage unit, and the control unit prohibits authentication and key exchange by the authentication key exchange unit when the version of the revocation list read from the storage unit by the revocation list receiving unit is older than the latest version.

In other words, the information processing device prohibits authentication and key exchange when storing an old version of the revocation list.

When the information processing device performs authentication and key exchange before communication with another device, and the authentication and key exchange are prohibited, the information processing device loses its ability to communicate. Therefore, with the above structure, it is expected that manufacturers will write a new revocation list on the information processing device.

(f) In the information processing device, the authentication key exchange unit shares a session key with the other device by performing the authentication and the key exchange, and the information processing device further comprises a revocation list updating unit operable to perform encrypted communication with the other device using the session key, to acquire from the other device a revocation list stored by the other device, and to update the revocation list stored in the storage unit to the revocation list acquired from the other device when the version of the revocation list stored in the storage unit is older than a version of the revocation list acquired from the other device.

With this structure, when the version of the revocation list is the same as or newer than the version information, the information processing device updates performs revocation list updating with the other device. By thus performing revocation list updating with the other device, the information processing device stores a newer revocation list.

(g) In the information processing device, the revocation list acquired from the other device has a digital signature provided thereto, the revocation list updating unit is further operable to verify whether the digital signature has been issued by the key issuing authority, and the revocation list updating unit updates the revocation list stored in the storage unit to the revocation list acquired from the other device when the verification is affirmative and does not update the revocation list stored in the storage unit when the verification is negative.

This structure prevents the revocation list in the storage unit from being updated to a malicious revocation list.

(h) In the information processing device, at least a part of the key information stored in the storage unit is encrypted with a unique key that is unique to the information processing device, and the information processing device further comprises: a unique key storage unit storing the unique key; and a decryption unit operable to decrypt the encrypted part of the key information using the unique key and to output the key information after decryption of the encrypted part thereof to the authentication key exchange unit.

With this structure, unencrypted key information is not output to a device external to the information processing device, thereby heightening the security of the key information.

In the industry of manufacturing and selling memory cards, such as SD memory cards, the present invention is useful as a mechanism for preventing the malicious act of writing an old revocation list onto a memory card.

REFERENCE SIGNS LIST 1 memory card manufacturing system
2 content playback system
10 key issuing authority
20 memory card manufacturing device
30, 30a, 40, 40a memory card
50 playback device
101 root private key storage unit
102 new registration accepting unit
103 version managing unit
104 revocation list managing unit
105 revocation list generating unit
106 key pair generating unit
107 certificate ID managing unit
108 certificate generating unit
109 signature providing unit
110 key information generating unit
111 key information transmitting unit
112 revocation list transmitting unit
201 revocation list transmitting unit
202 key information transmitting unit
301, 301a controller
302 storage unit
303 root public key storage unit
304 revocation list receiving unit
305 key information receiving unit
306 signature verification unit
307 key information writing unit
308 version verification unit
309 revocation list writing unit
311 controller unique key storage unit
312 encryption unit
401, 401a controller
402 storage unit
421 root public key storage unit 422 version verification unit
423 authentication key exchange unit
424 authentication unit
425 session key generating unit
426 revocation list updating unit
427 revocation determining unit
428 content key transmitting unit
429 encrypted content transmitting unit
431 controller unique key storage unit
432 decryption unit
502 storage unit
521 root public key storage unit
522 version verification unit
523 authentication key exchange unit
524 version verification unit
524 authentication unit
525 session key generating unit
526 revocation list updating unit
527 revocation determining unit
528 content key receiving unit
529 encrypted content receiving unit
530 decryption unit
531 decryption unit
532 playback unit

The invention claimed is:

1. An information processing device for performing authentication and key exchange using key information, the information processing device comprising:
   a data storage; and
   a controller configured to operate as:
   a key information receiving unit receiving key information that includes a private key, a certificate, a minimum version, and a digital signature from a key issuing authority, at least the minimum version and the private key being received at the same time, the key information being generated by the key issuing authority and the minimum version indicating a version of a revocation list generated when the key information that includes the private key is generated;
   a revocation list receiving unit receiving a revocation list having a version from the key issuing authority; and
   a comparison unit comparing the version of the revocation list received by the revocation list receiving unit and the minimum version retrieved from the key information, and verifying the revocation list,
   wherein when the version of the revocation list is equal to or higher than the minimum version, the controller writes the revocation list to the data storage, and the information processing device incorporates the revocation list as an initial revocation list,
   when the version of the revocation list is lower than the minimum version, the controller prohibits writing of the revocation list to the data storage, and
   wherein the controller receives the key information and the revocation list, and performs the comparison at a manufacturing time of the information processing device which is a memory device.

2. The information processing device of claim 1, wherein the controller further comprises a verification unit operable to verify, by using the digital signature, whether or not the minimum version is associated with the private key and the certification, and
   the comparison unit compares the version of the revocation list received by the revocation list receiving unit and the minimum version when the verification unit affirmatively verifies that the minimum version is associated with the private key and the certificate.

3. The information processing device of claim 2, wherein the data storage stores the revocation list received by the revocation list receiving unit, and
   the controller further comprising
   a revocation determining unit determining, using the revocation list stored in the data storage, whether another device has been revoked.

4. The information processing device of claim 1, wherein the controller further comprises:
   a unique key storage unit storing a unique key that is unique to the controller;
   an encryption unit encrypting at least a part of the key information issued by the key issuing authority using the unique key stored in the unique key storage unit; and
   a key information writing unit writing, in the data storage, the key information that has at least a part thereof encrypted.

5. The information processing device of claim 1, wherein the data storage stores the key information received by the key information receiving unit and the revocation list received by the revocation list receiving unit,
   the controller further comprises an authentication key exchange unit performing authentication and key exchange with another device using the key information,
   the comparison unit further compares the minimum version retrieved from the key information stored in the data storage and the version of the revocation list stored in the data storage, and verifies the revocation list,
   the authentication key exchange unit performs an authentication and key exchange when the version of the revocation list is equal to or higher than the minimum version, and
   the authentication key exchange unit prohibits authentication and key exchange when the version of the revocation list is lower than the minimum version.

6. The information processing device of claim 5, wherein the authentication key exchange unit shares a session key with the other device by performing the authentication and the key exchange, and
   the controller further comprises a revocation list updating unit performing encrypted communication with the other device using the session key, acquiring from the other device a revocation list stored by the other device, and updating the revocation list stored in the data storage to the revocation list acquired from the other device when the version of the revocation list stored in the data storage is lower than a version of the revocation list acquired from the other device.

7. The information processing device of claim 6, wherein the revocation list acquired from the other device has a digital signature provided thereto,
   the revocation list updating unit further verifies whether the digital signature has been issued by the key issuing authority, and
   the revocation list updating unit updates the revocation list stored in the data storage to the revocation list acquired from the other device when the verification is affirmative and does not update the revocation list stored in the data storage when the verification is negative.

8. The information processing device of claim 5, wherein at least a part of the key information stored in the data storage is encrypted with a unique key that is unique to the controller, and
   the controller further comprises:
   a unique key storage unit storing the unique key; and
   a decryption unit decrypting the encrypted part of the key information using the unique key and to output the key information after decryption of the encrypted part thereof to the authentication key exchange unit.

9. The information processing device of claim 1, wherein the information processing device is a memory card including the data storage constituted by a flash memory and the controller.

10. A controller incorporated in a memory card of an information processing device, the controller comprising:
  a key information receiving circuit receiving key information that includes a private key, a certificate, a minimum version, and a digital signature from a key issuing authority, at least the minimum version and the private key being received at the same time, the key information being generated by the key issuing authority and the minimum version indicating a version of a revocation list generated when the key information that includes the private key is generated;
  a revocation list receiving circuit receiving a revocation list having a version from the key issuing authority; and
  a comparison circuit comparing the version of the revocation list received by the revocation list receiving circuit and the minimum version retrieved from the key information, and verifying the revocation list,
  wherein when the version of the revocation list is equal to or higher than the minimum version, the controller writes the revocation list to data storage in the memory card, and the
  memory card incorporates the revocation list as an initial revocation list,
  when the version of the revocation list is lower than the minimum version, the controller prohibits writing of the revocation list to the data storage in the memory card, and
  wherein the controller receives the key information and the revocation list and performs the comparison at a manufacturing time of the information processing device which is a memory device.

11. A method for judging revocation list validity used in an information processing device for performing authentication and key exchange using key information, the information processing device including a non-transitory data storage and a controller configured to perform the method for judging revocation list validity comprising:
  a key information receiving step of receiving key information that includes a private key, a certificate, a minimum version, and a digital signature from a key issuing authority, at least the minimum version and the private key being received at the same time, the key information being generated by the key issuing authority and the minimum version indicating a version of a revocation list generated when the key information that includes the private key is generated;
  a revocation list reception step of receiving a revocation list having a version from the key issuing authority;
  a comparison step of comparing the version of the received revocation list and the minimum version retrieved from the key information, and verifying the revocation list; and
  a control step of writing the revocation list to the data storage when the version of the revocation list is equal to or higher than the minimum version and incorporating the revocation list as an initial revocation list, and of prohibiting writing the revocation list to the data storage when the version of the revocation list is lower than the minimum version, and
  wherein the key information and the revocation list are received and the comparison is performed at a manufacturing time of the information processing device which is a memory device.

* * * * *